(12) United States Patent
Matsuo et al.

(10) Patent No.: US 8,660,096 B2
(45) Date of Patent: Feb. 25, 2014

(54) BASE STATION DEVICE IN MULTI-CARRIER TRANSMISSION, MOBILE STATION DEVICE, AND CELL SEARCH METHOD

(75) Inventors: Hidenori Matsuo, Kanagawa (JP); Katsuhiko Hiramatsu, Kanagawa (JP); Akihiko Nishio, Kanagawa (JP); Ayako Horiuchi, Kanagawa (JP); Hiroki Haga, Kanagawa (JP)

(73) Assignee: Panasonic Corporation, Osaka (JP)

(*) Notice: Subject to any disclaimer, the term of this patent is extended or adjusted under 35 U.S.C. 154(b) by 1462 days.

(21) Appl. No.: 11/576,243

(22) PCT Filed: Sep. 29, 2005

(86) PCT No.: PCT/JP2005/018021
§ 371 (c)(1),
(2), (4) Date: Dec. 6, 2007

(87) PCT Pub. No.: WO2006/035903
PCT Pub. Date: Apr. 6, 2006

(65) Prior Publication Data
US 2008/0095287 A1    Apr. 24, 2008

(30) Foreign Application Priority Data

Sep. 30, 2004   (JP) ................... 2004-289149
Apr. 27, 2005   (JP) ................... 2005-130440

(51) Int. Cl.
*H04B 7/216*  (2006.01)
*H04J 11/00*  (2006.01)

(52) U.S. Cl.
USPC ................ 370/335; 370/320; 370/208

(58) Field of Classification Search
USPC ............................... 370/335, 208–210
See application file for complete search history.

(56) References Cited

U.S. PATENT DOCUMENTS

| 6,741,578 | B1 | 5/2004 | Moon et al. |
| 7,218,617 | B1* | 5/2007 | Usuda et al. ............. 370/320 |
| 2003/0152178 | A1 | 8/2003 | Tanno et al. |
| 2004/0085946 | A1 | 5/2004 | Morita et al. |

FOREIGN PATENT DOCUMENTS

| JP | 2002543737 | 12/2002 |
| JP | 2003179522 | 6/2003 |
| JP | 2003244763 | 8/2003 |

OTHER PUBLICATIONS

PCT International Search Report dated Oct. 25, 2005.
M. Morita, et al.; "Kudari OFDM Musen Access ni okeru Pilot Channel no Saitekika Oyobi 4 Dankai Cell Search-ho to Sono Tokusei," IEICE technical report RCS2004-254, vol. 104, No. 597, Jan. 19, 2005, pp. 109-114.

* cited by examiner

*Primary Examiner* — Afshawn Towfighi
(74) *Attorney, Agent, or Firm* — Dickinson Wright PLLC

(57) ABSTRACT

There is provided a mobile station device capable of reducing processing of cell search. In this device, an FFT timing detection unit (603) detects a symbol timing and a frame timing detection unit (606) detects a frame timing by using the frame timing detection symbol. After a frame timing is detected, a code group detection unit (608) detects a code group and a scrambling code identification unit (610) identifies a scrambling code. That is, the frame timing detection process is separated from the code group detection process and after detecting the frame timing, a symbol timing multiplied by the code group sequence is identified so that the code group is detected only at the symbol timing.

17 Claims, 41 Drawing Sheets

BASE STATION DEVICE IN MULTI-CARRIER TRANSMISSION, MOBILE STATION DEVICE, AND CELL SEARCH METHOD

TECHNICAL FIELD

The present invention relates to a base station apparatus, mobile station apparatus and cell search method in multicarrier transmissions.

BACKGROUND ART

With a wide area mobile communication represented by a cellular phone or the like, to reduce the output of a radio wave from the base station, one base station controls to cover a small divided communication area called "cell." When power is turned on or when handover takes place, a mobile station such as a cellular phone can continue communication by selecting and using these cells (base stations) as appropriate. Selecting a cell by a mobile station is called a "cell search." In a cell search, the mobile station detects an optimum cell to which the mobile station should be connected when power is turned on—that is, a cell having a minimum path loss. More specifically, cells are identified by peculiar scrambling codes, and cell search is performed by the mobile station by detecting a scrambling code of a cell which transmits a signal with maximum reception power in a downlink.

However, there is a problem that it takes a considerable time and computing load for the mobile station to identify many scrambling codes at one time, and there is therefore a growing demand for a technology which solves this problem.

Examples of conventional technologies related to cell search include a three-stage cell search scheme of the OFCDM (Orthogonal Frequency and Code Division Multiplexing) scheme (for example, see patent document 1).

According to the conventional technology described in patent document 1, scrambling codes can be detected at high speed by grouping the scrambling codes into several groups (for example, 32 groups). More specifically, in a second stage, a correlation between neighboring symbols is calculated to detect frame timing and a code group, and in a third stage, scrambling codes are identified from scrambling code candidates which belong to the code group detected in the second stage through a correlation calculation.

FIG. 1 shows a conventional frame configuration of OFCDM. As shown in FIG. 1, pilot symbols continue on a frame boundary in the time axis direction and a pilot symbol at the end of the frame is multiplied by a code group sequence indicating a group of scrambling codes.

FIG. 2 shows the conventional second stage processing of a cell search performed at the mobile station. The mobile station detects frame timing and a scrambling code group by calculating a correlation between a sequence extracted through a complex conjugate multiplication between neighboring symbols and a code group candidate. The code group and frame timing are detected at the same time through this correlation calculation among the neighboring pilot symbols.
Patent Document 1: Japanese Patent Application Laid-Open No. 2003-244763

DISCLOSURE OF INVENTION

Problems to be Solved by the Invention

However, the conventional technology shown in patent document 1 detects a code group and frame timing at the same time and requires performing correlation calculations corresponding in number to code groups to with all symbols in one frame, which results in an increase of the amount of processing in the second stage.

It is an object of the present invention to provide a base station apparatus, mobile station apparatus and cell search method that are able to reduce processing of cell search.

Means for Solving the Problem

The base station apparatus of the present invention adopts a configuration having a configuration section that configures a frame from pilot symbols and data symbols; a multiplication section that multiplies a specific pilot symbol or a specific data symbol included in the frame by a code group sequence to generate a code group detection symbol; and a transmission section that transmits the frame including a frame timing detection symbol and the code group detection symbol.

Furthermore, the mobile station apparatus of the present invention adopts a configuration having a first detection section that detects a frame timing, and a second detection section that detects a code group after detecting the frame timing.

Advantageous Effect of the Invention

According to the present invention, processing of a cell search can be reduced.

BEST MODE FOR CARRYING OUT THE INVENTION

Hereinafter, embodiments of the present invention will be explained in detail with reference to the attached drawings. Each of the following embodiments reduces the amount of calculation in the second stage (frame timing detection processing and code group detection processing) in a cell search consisting of the first to third stages.

(Embodiment 1)

Figure 1:
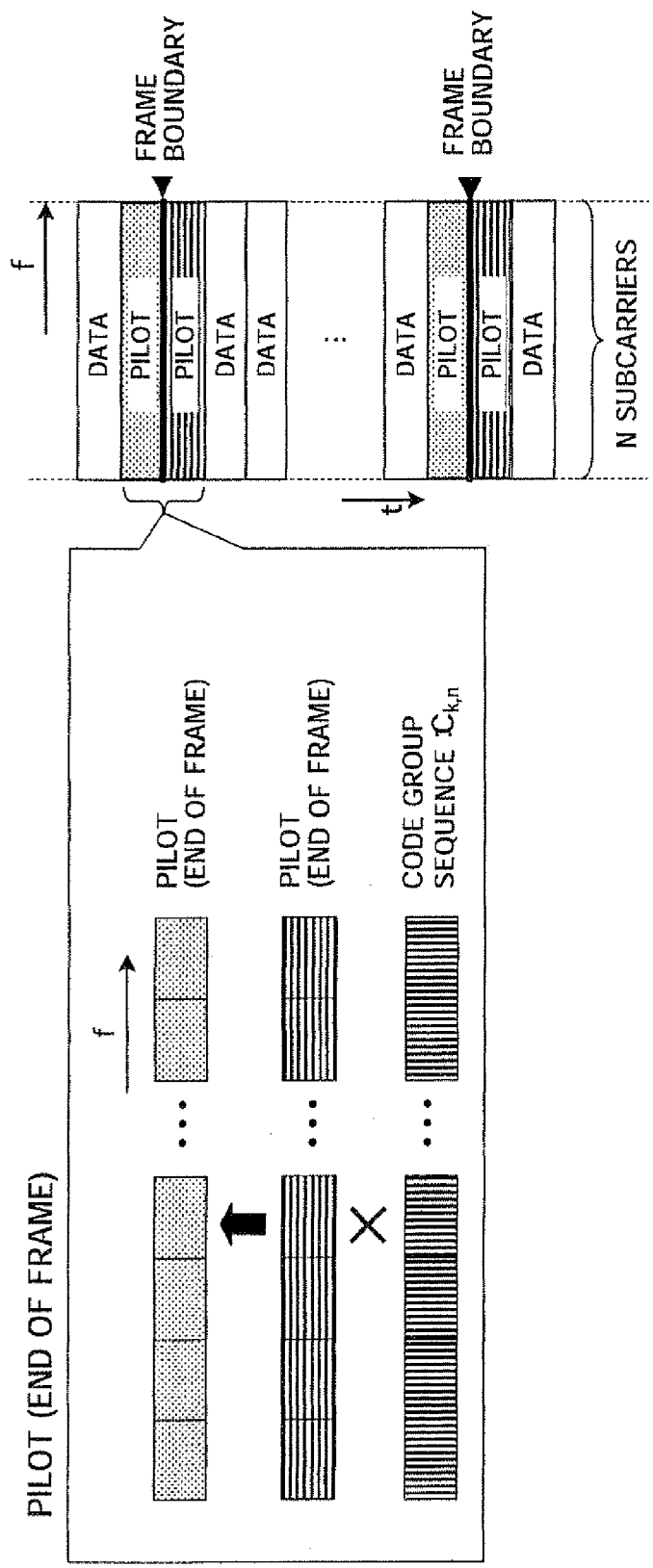
FIG. 1 is a transmission frame format of a conventional base station apparatus.
Figure 2:
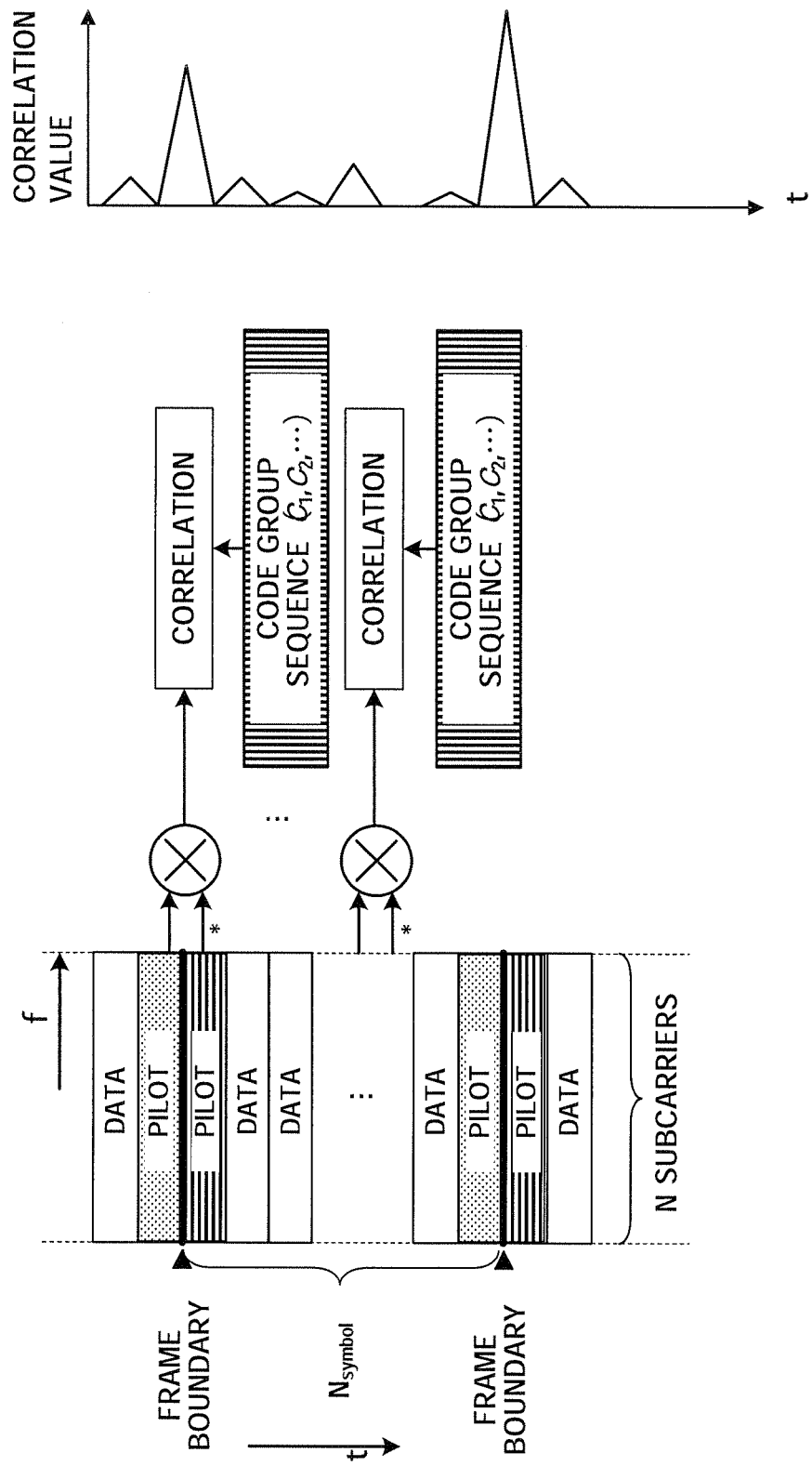
FIG. 2 shows the cell search operations by a conventional mobile station apparatus.
Figure 3:
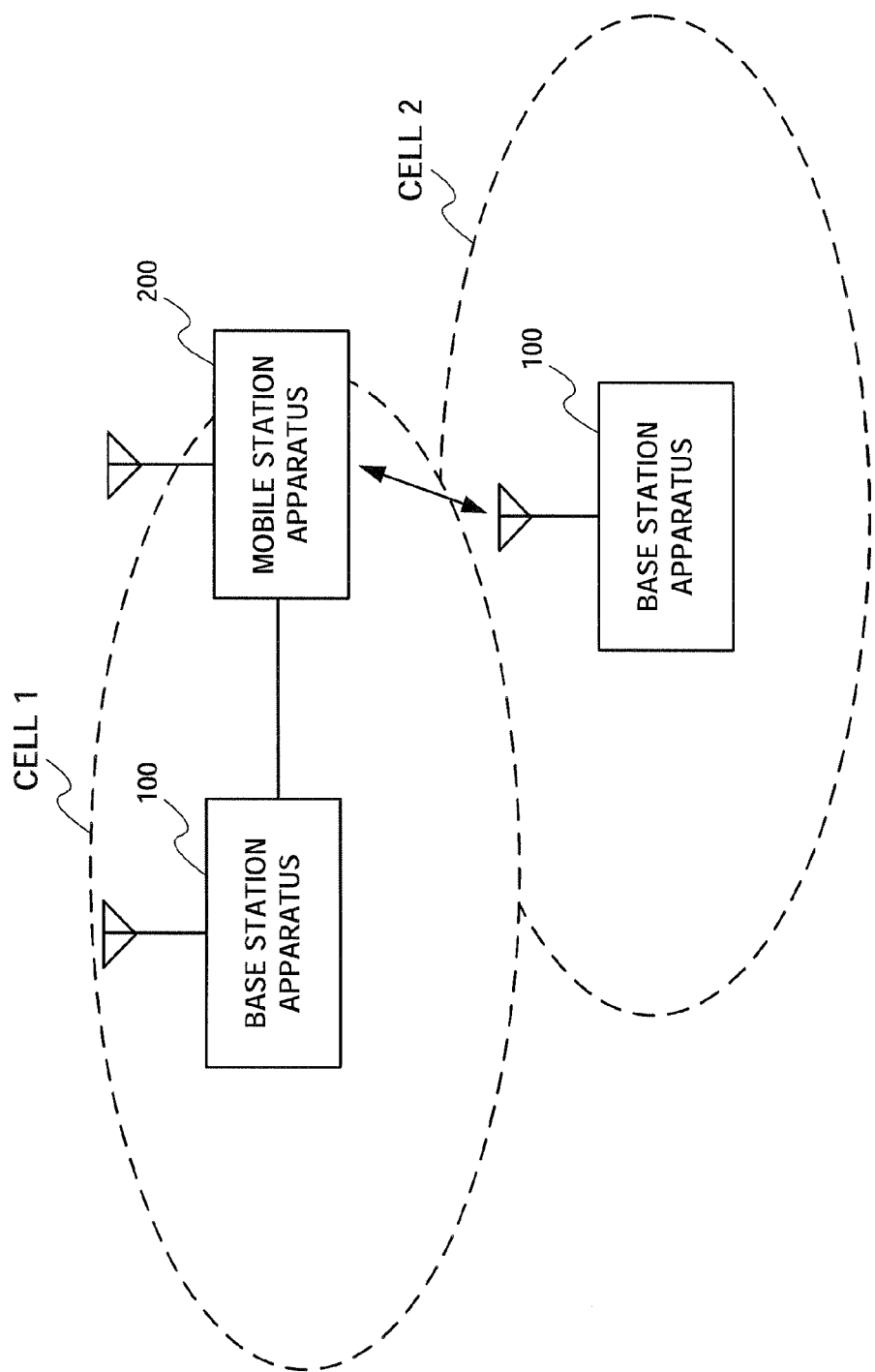
FIG. 3 is a configuration diagram of a mobile communication system according to Embodiment 1.

As shown in FIG. 3, a mobile communication system according to this embodiment has base station apparatus 100 and mobile station apparatus 200. Mobile station apparatus 200 receives a signal transmitted from base station apparatus 100 of cell 1 or cell 2 and performs a cell search using this received signal.

Figure 4:
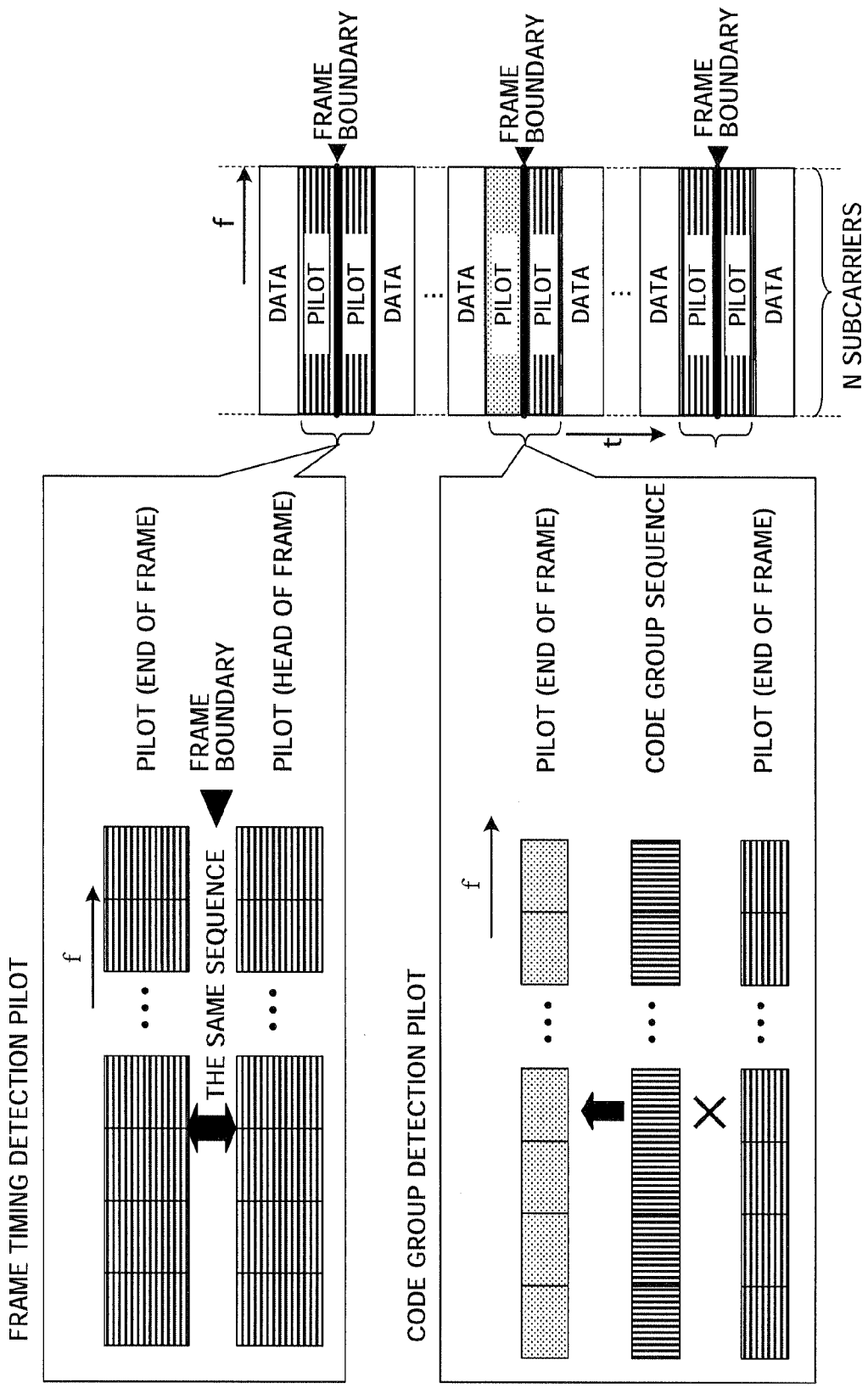
FIG. 4 is a transmission frame format of a base station apparatus according to Embodiment 1.

FIG. 4 is a transmission frame format of base station apparatus 10. Conventionally, there is only one type of pilot symbol, but this embodiment uses two types of pilot symbols—pilot symbol for frame timing detection and pilot symbol for code group detection. As shown in FIG. 4, these two types of pilot symbols are alternately inserted in the frame boundary every two frames in the time axis direction. That is, frame timing detection symbols and code group detection symbols are arranged at different positions on the time axis. For frame timing detection pilot symbols, neighboring pilot symbols which are not multiplied by a code group sequence are used. That is, pilot symbols of the same sequence are arranged neighboring each other on the frame boundary as symbols for frame timing detection. Code group detection pilot symbols have the same configuration as conventional pilot symbols. Only a pilot symbol at the end of a frame out of pilot symbols neighboring each other is multiplied by a code group sequence every two frames.

Figure 5:
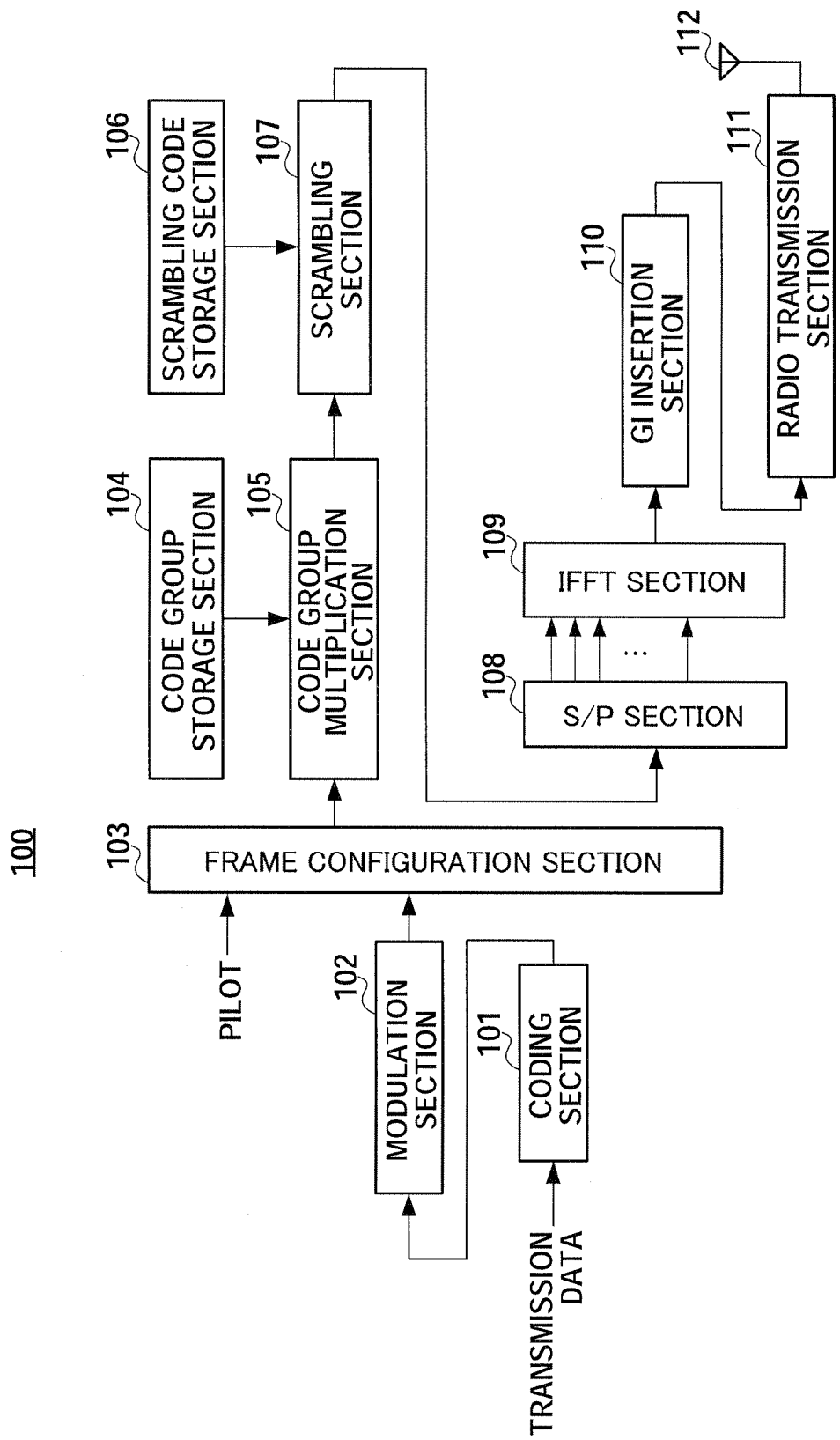
FIG. 5 is a block diagram showing the configuration of the base station apparatus according to Embodiment 1.

Next, the configuration of base station apparatus 100 according to this embodiment will be explained. As shown in FIG. 5, base station apparatus 100 has: coding section 101 which codes transmission data; modulation section 102 which modulates the coded data; frame configuration section 103 which constitutes a frame from the modulated data and a pilot signal; code group multiplication section 105 which multiplies a specific pilot symbol or a specific data symbol by a code group sequence selected in code group storage section 104; scrambling section 107 which multiplies all symbols by a scrambling code selected in scrambling code storage section 106; S/P section 108 which converts the symbol sequence multiplied by the scrambling code from serial to parallel; IFFT section 109 which performs IFFT processing on the symbol sequence converted to parallel; GI insertion section 110 which inserts a guard interval (GI) in an OFDM symbol (multicarrier signal) generated by IFFT; and radio transmission section 111 which transmits the OFDM symbol after the GI insertion to mobile station apparatus 200 through antenna 112.

Figure 6:
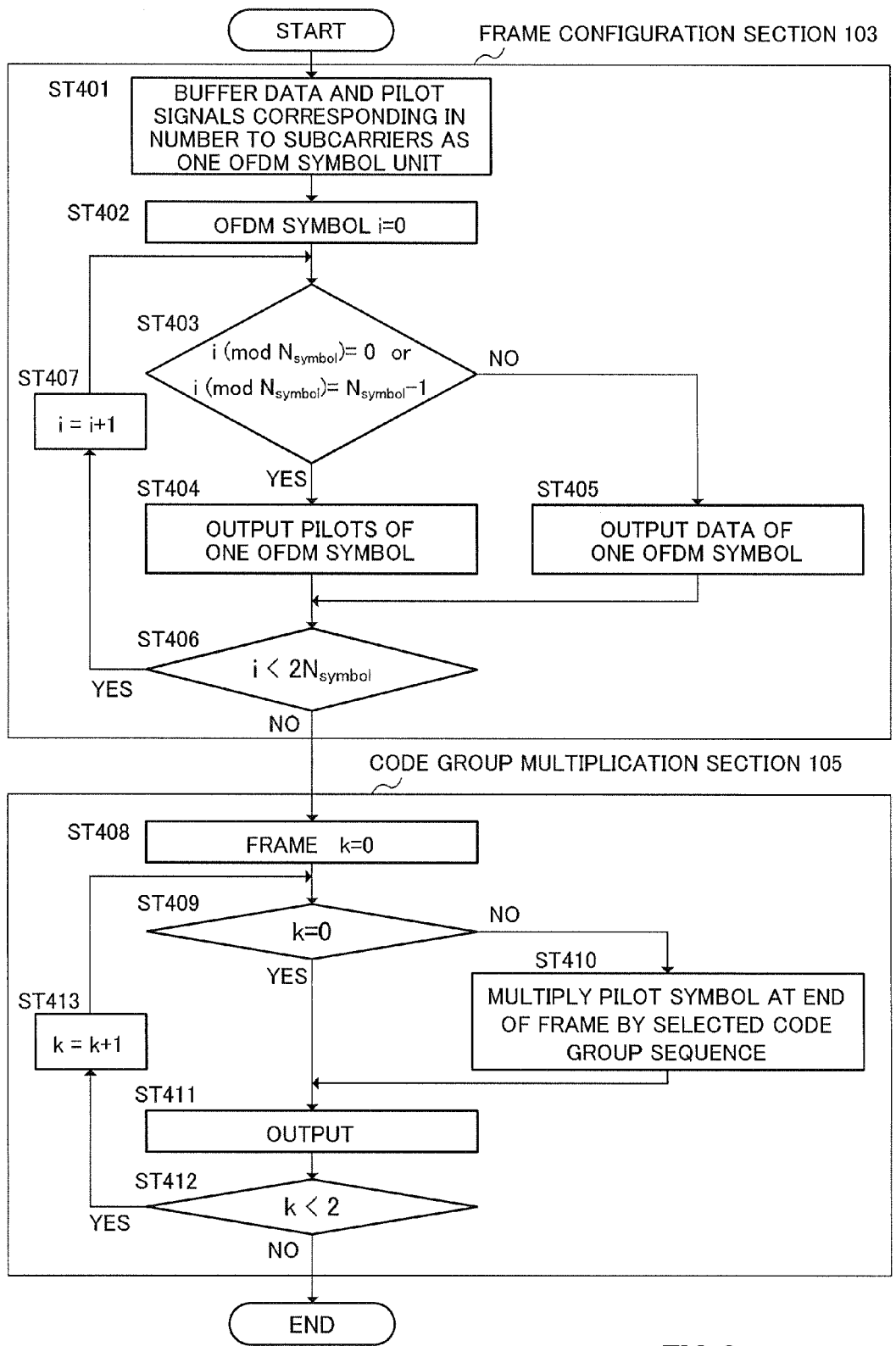
FIG. 6 is an operation flowchart of the base station apparatus according to Embodiment 1.

Next, the operations of frame configuration section 103 and code group multiplication section 105 of base station apparatus 100 will be explained using a flowchart in FIG. 6. ST (step) 401 to 407 are processing at frame configuration section 103 and ST408 to 413 are processing at code group multiplication section 105.

In base station apparatus 100, using the transmission data and pilot signals modulated by modulation section 102 as inputs, frame configuration section 103 buffers data and pilot signals corresponding in number to subcarriers on one OFDM symbol unit basis (ST401). Next, OFDM symbol number i is reset (ST402). Assume that the number of OFDM symbols per frame is $N_{symbol}$, when OFDM symbol number i (mod $N_{symbol}$)=0 or $N_{symbol}-1$ (ST403: YES), pilot symbols of one OFDM symbol are output from frame configuration section 103 (ST404). On the other hand, when i (mod $N_{symbol}$)=0 or $N_{symbol}-1$ is not the case (ST403: NO), the data of one OFDM symbol is output from data frame configuration section 103 (ST405). Then, the processing in ST403 to ST405 are repeated under a condition of $i<2_{NSymbol}$, assuming i=i+1 (that is, corresponding to 2 frames) (ST406 and ST407).

When numbers are sequentially assigned to frames of an OFDM signal, like k=0, 1, . . . (ST408 and ST413), if k=0 is not the case (ST409: NO), the pilot symbol at the end of the frame among output signals of frame configuration section 103 is multiplied by a code group sequence selected from code group sequences stored in code group storage section 104 (ST410) and is output from code group multiplication section 105 (ST411). When k=0 (ST409: YES), the output signal of frame configuration section 103 is directly output from code group multiplication section 105 (ST411). The processing in ST409 to ST411 are repeated assuming k=k+1 under a condition of k<2 (ST412 and ST413). Through this processing, code group multiplication section 105 multiplies the pilot symbol at the end of the frame by a code group sequence every two frames. The configuration of the frame output as a result is as shown in above FIG. 4. Such a frame including a frame timing detection pilot and a code group detection pilot is transmitted to mobile station apparatus 200 by radio transmission section 111.

Figure 7:
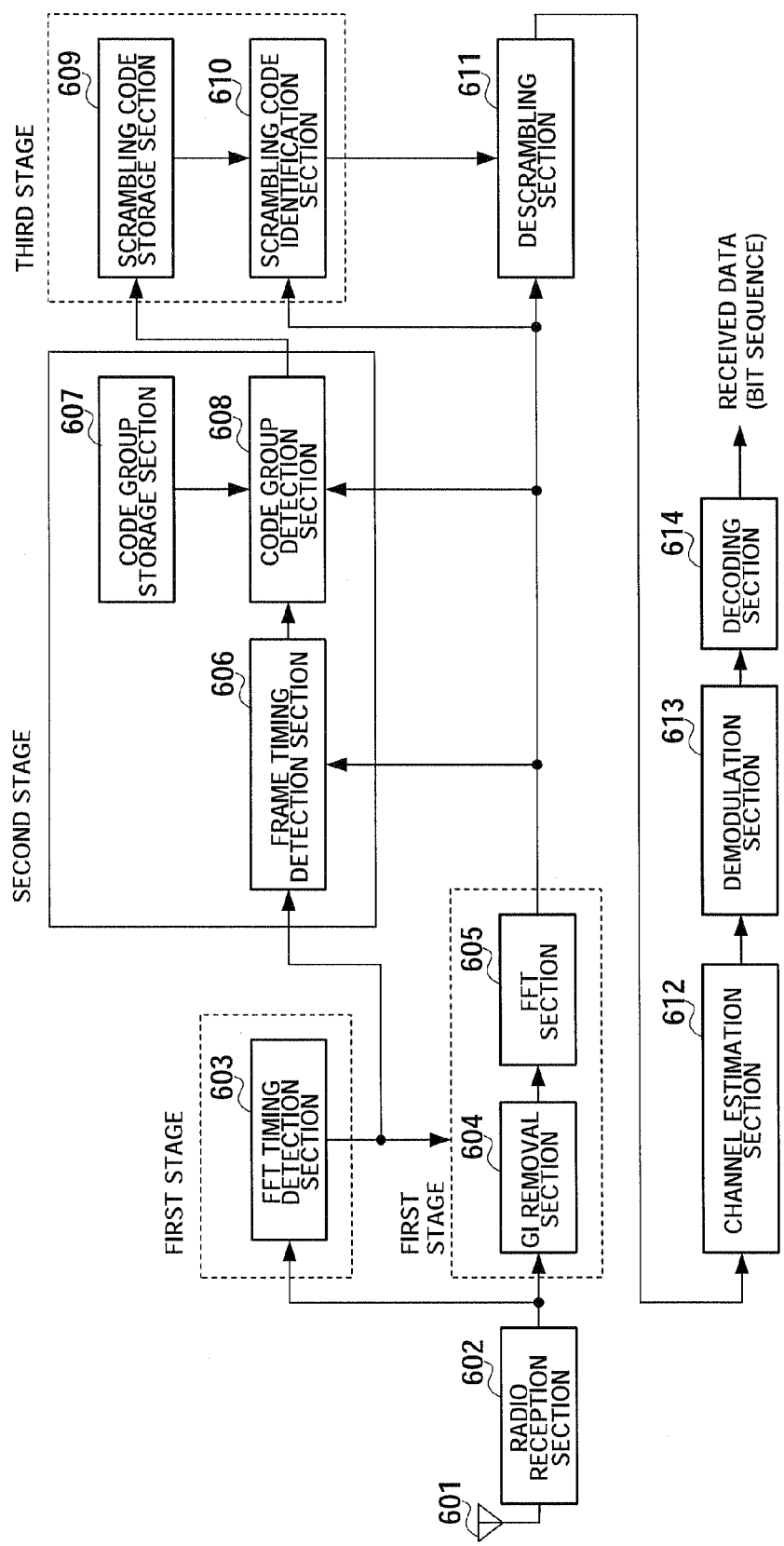
FIG. 7 is a block diagram showing the configuration of a mobile station apparatus according to Embodiment 1.

Next, the configuration of mobile station apparatus 200 will be explained. As shown in FIG. 7, the mobile station apparatus according to this embodiment has: radio reception section 602 which receives an OFDM symbol transmitted from base station apparatus 100 through antenna 601; FFT timing detection section 603 which detects symbol timing of FFT and outputs FFT timing information; GI removal section 604 which removes a GI of the OFDM symbol; FFT section 605 which performs FFT processing on the OFDM symbol; frame timing detection section 606 which detects frame timing and outputs frame timing information; code group storage section 607 which stores code group sequence candidates; code group detection section 608 which detects a code group and outputs code group information; scrambling code storage section 609 which stores scrambling code candidates; scrambling code identification section 610 which identifies a scrambling code and outputs code information; descrambling section 611 which descrambles the received signal using the identified scrambling code; channel estimation section 612 which performs channel estimation on the received signal; demodulation section 613 which demodulates the received signal; and decoding section 614 which decodes the demodulated signal.

Next, the operations of mobile station apparatus 200 will be explained. A cell search carried out at mobile station apparatus 200 is classified into processing in the first to third stages, and FFT timing detection section 603, GI removal section 604 and FFT section 605 perform processing in the first stage, frame timing detection section 606, code group storage section 607 and code group detection section 608 perform processing in the second stage, and scrambling code storage section 609 and scrambling code identification section 610 perform processing in the third stage.

In mobile station apparatus 200, an OFDM symbol received at radio reception section 602 through antenna 601 is input to FFT timing detection section 603 and FFT timing detection section 603 detects symbol timing as the first stage.

Figure 8A:
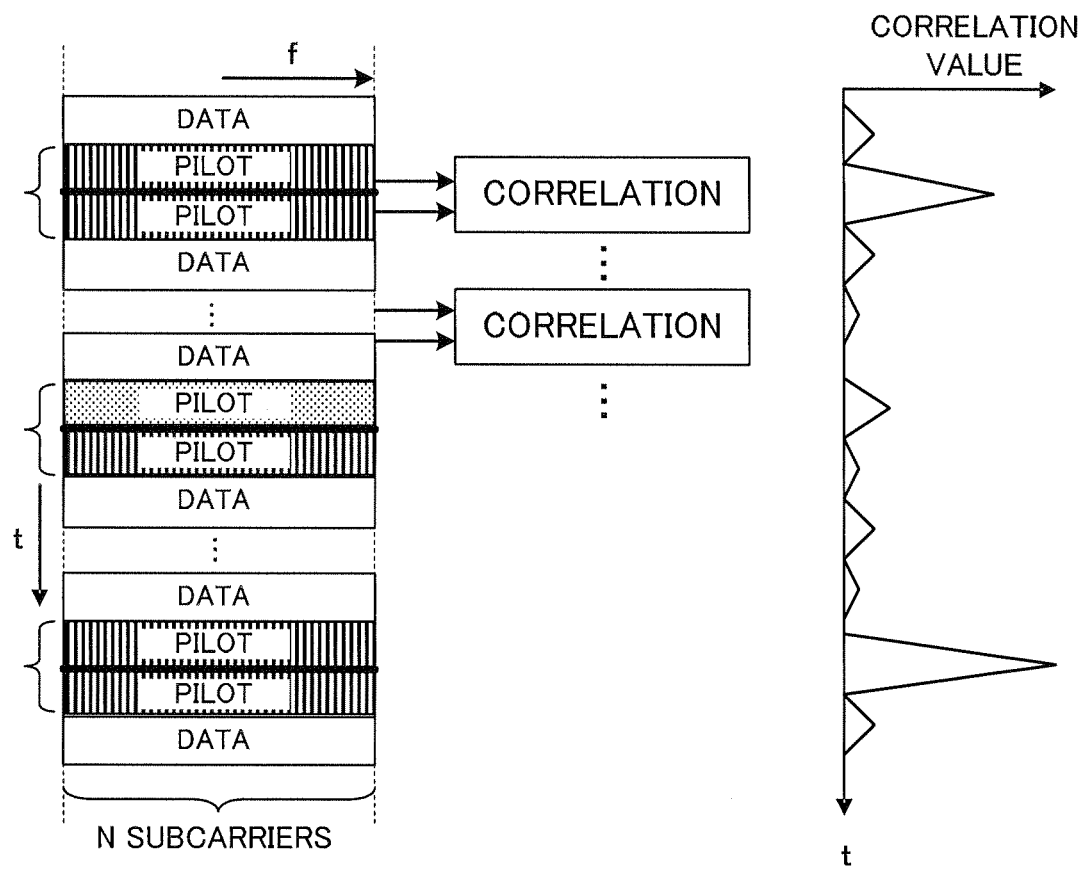
FIG. 8A shows the cell search operations by the mobile station apparatus according to Embodiment 1.
Figure 8B:
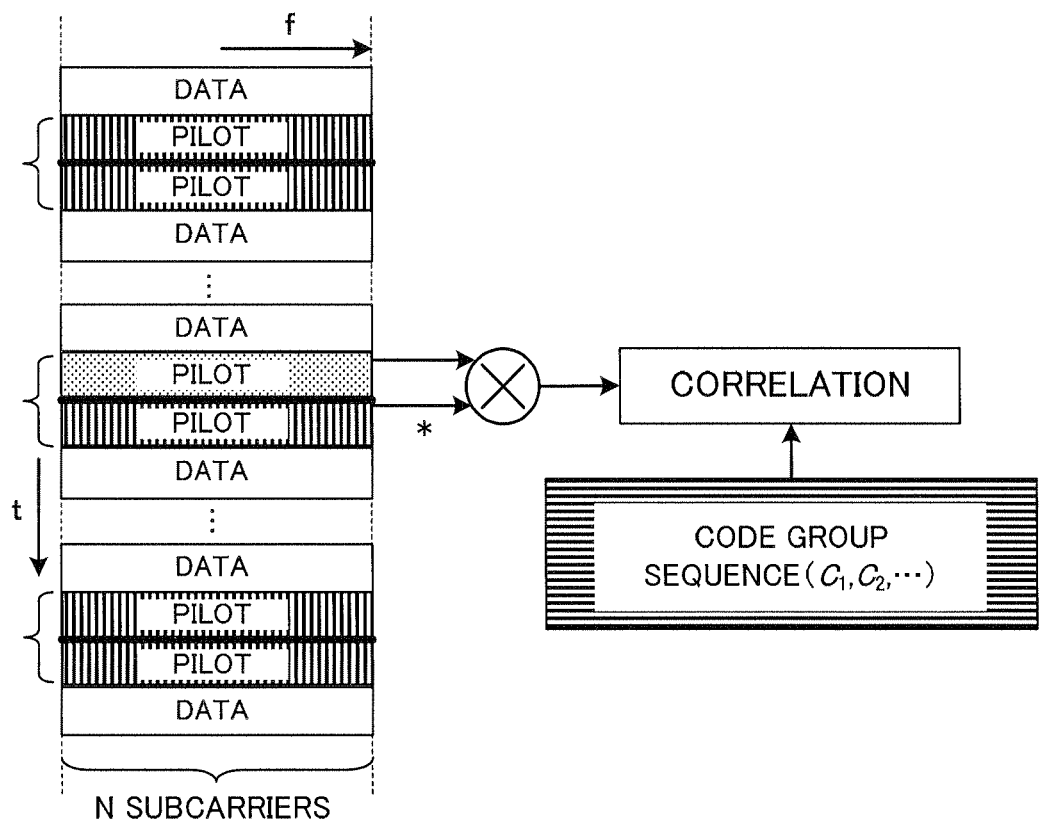
FIG. 8B shows the cell search operations by the mobile station apparatus according to Embodiment 1.

As the second stage, frame timing detection section 606 and code group detection section 608 detect frame timing and a code group, respectively, as shown in FIGS. 8A and 8B in accordance with the symbol timing detected in the first stage. Details of the processing in the second stage will be described later.

The OFDM symbol is rid of the GI at GI removal section 604 and is subjected to FFT processing at FFT section 605 according to the symbol timing detected in the first stage. A scrambling code candidate which belongs to the code group detected in the second stage is extracted from scrambling code storage section 609, and a scrambling code is identified through a correlation calculation as the third stage. Descrambling section 611 then descrambles a received signal using the identified scrambling code.

Figure 9:
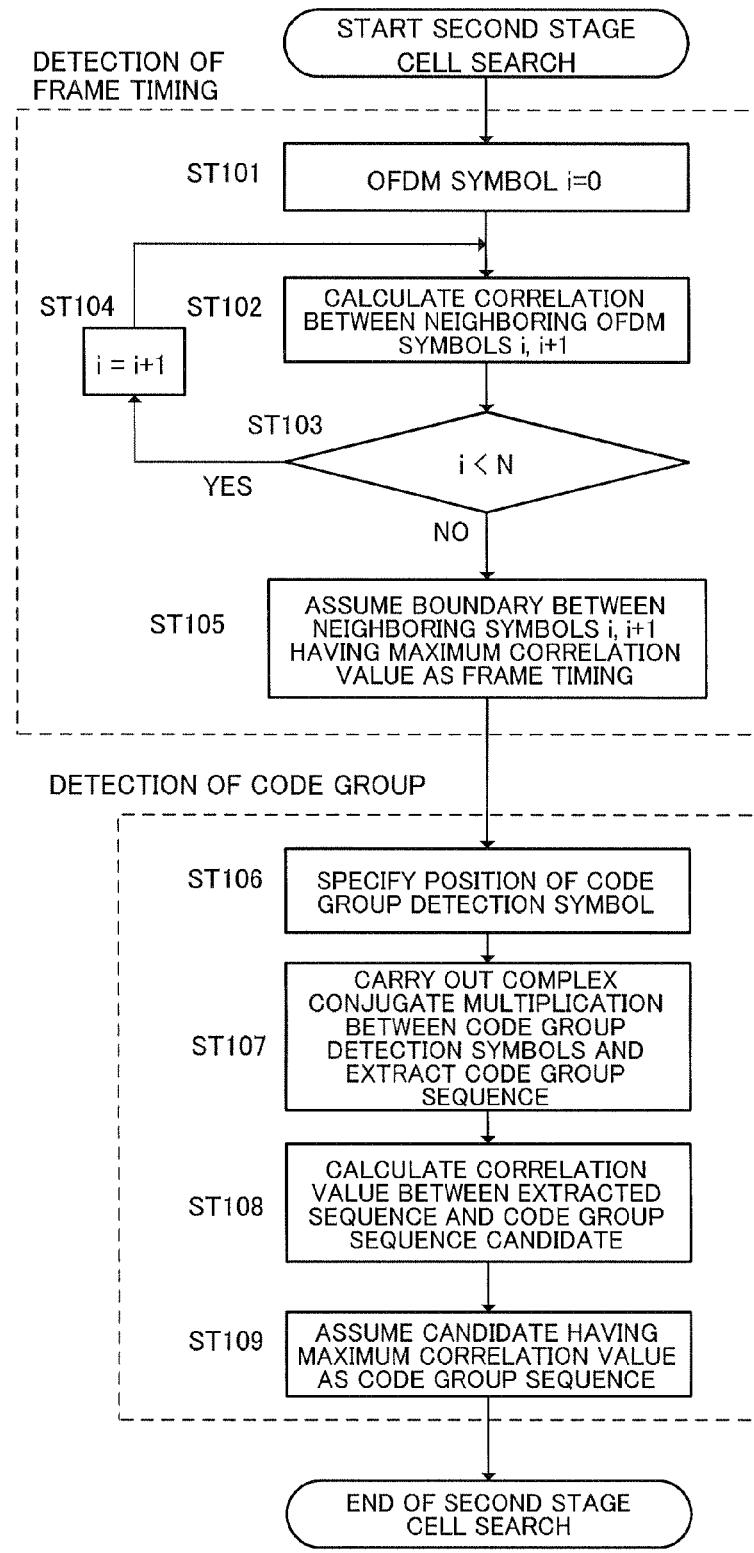
FIG. 9 is an operation flowchart of the mobile station apparatus according to Embodiment 1.

Hereinafter, the detailed processing procedure in the second stage will be explained using a flowchart in FIG. 9.

(Detection of Frame Timing: FIG. 8A)

First, according to symbol timing detected at FFT timing detection section 603, frame timing detection section 606 calculates a correlation between neighboring symbols and i+1 (ST101, ST102). Assuming $N=2N_{symbol}$, if symbol is i<$2N_{symbol}$ (ST103: YES), the processing returns to ST102 assuming i=i+1 (ST104). If i<$2N_{symbol}$ is not the case (ST103: NO), assume that the boundary between neighboring symbols i and i+1 that obtain the maximum correlation value in ST102 is frame timing (ST105).

Figure 10:
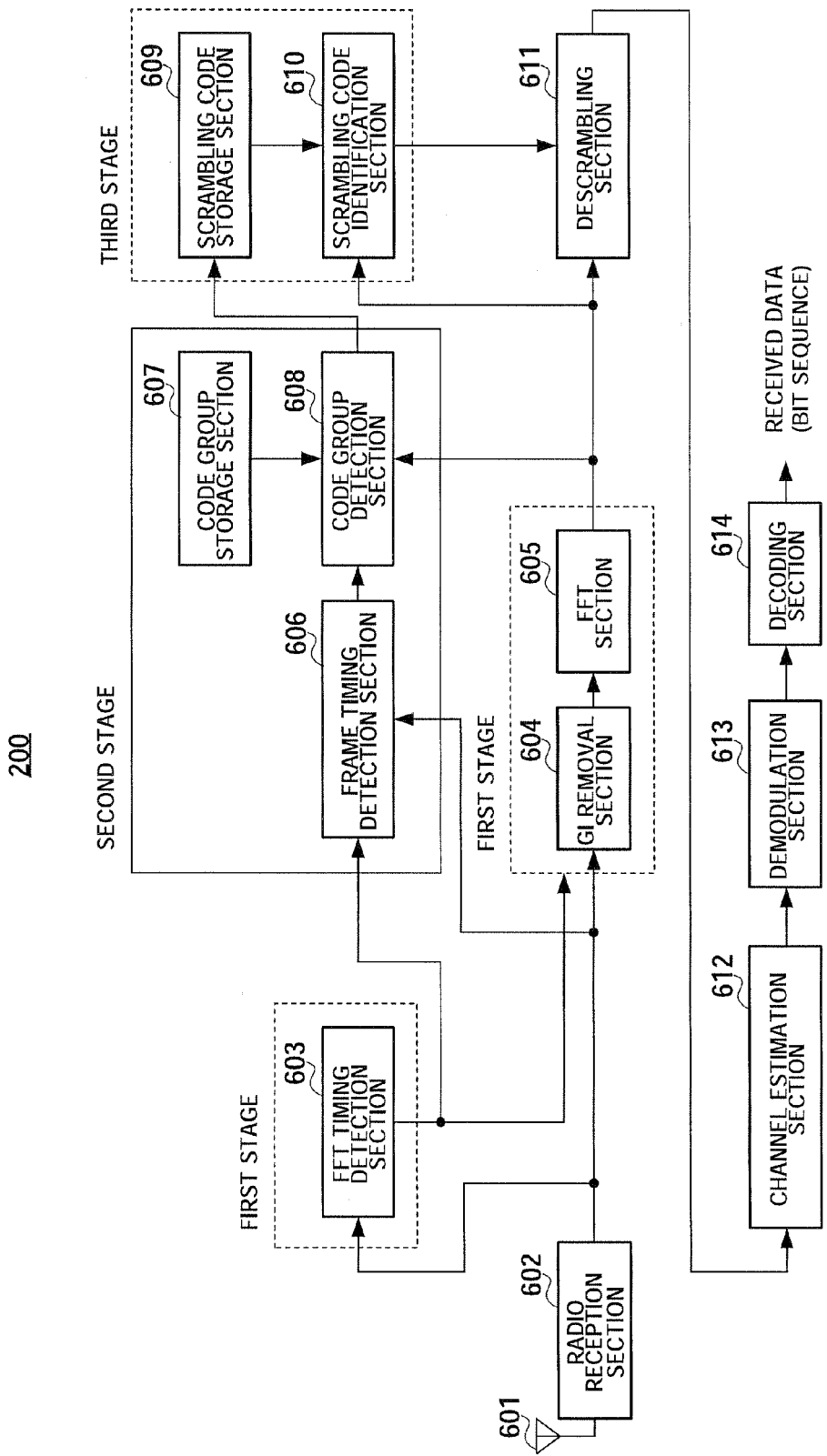
FIG. 10 is a block diagram (modification example) showing the configuration of the mobile station apparatus according to Embodiment 1.

Instead of detecting frame timing using a signal after FFT as shown in FIG. 7, it is also possible to detect frame timing using a signal before FFT as shown in FIG. 10. By this means, a correlation between neighboring symbols can be calculated not in subcarrier units but in OFDM symbol units.

(Detection of Code Group: FIG. 8B)

Code group detection pilot symbols are arranged on the frame boundary that is next to the frame boundary in which a frame timing detection pilot symbol is inserted, code group detection section 608 specifies the position of the code group detection pilot symbol in accordance with the frame timing detected in ST105 (ST106). After the specification, a complex conjugate multiplication is performed between the neighboring symbols in the code group detection pilot symbol, and a code group sequence is thereby extracted (ST107). A correlation value between the extracted code group sequence and the code group candidate is calculated (ST108), and a candidate which has a maximum correlation value is regarded as a code group sequence (ST109).

In this way, according to this embodiment, by separating frame timing detection processing from code group detection processing, specifying symbol timing at which the code group sequence is multiplied after the detection processing of the frame timing and performing code group detection processing at only that symbol timing, it is not necessary to perform code group detection processing on all symbols and it is possible to reduce the amount of calculation of the processing in the second stage of a cell search.

(Embodiment 2)

Figure 11:
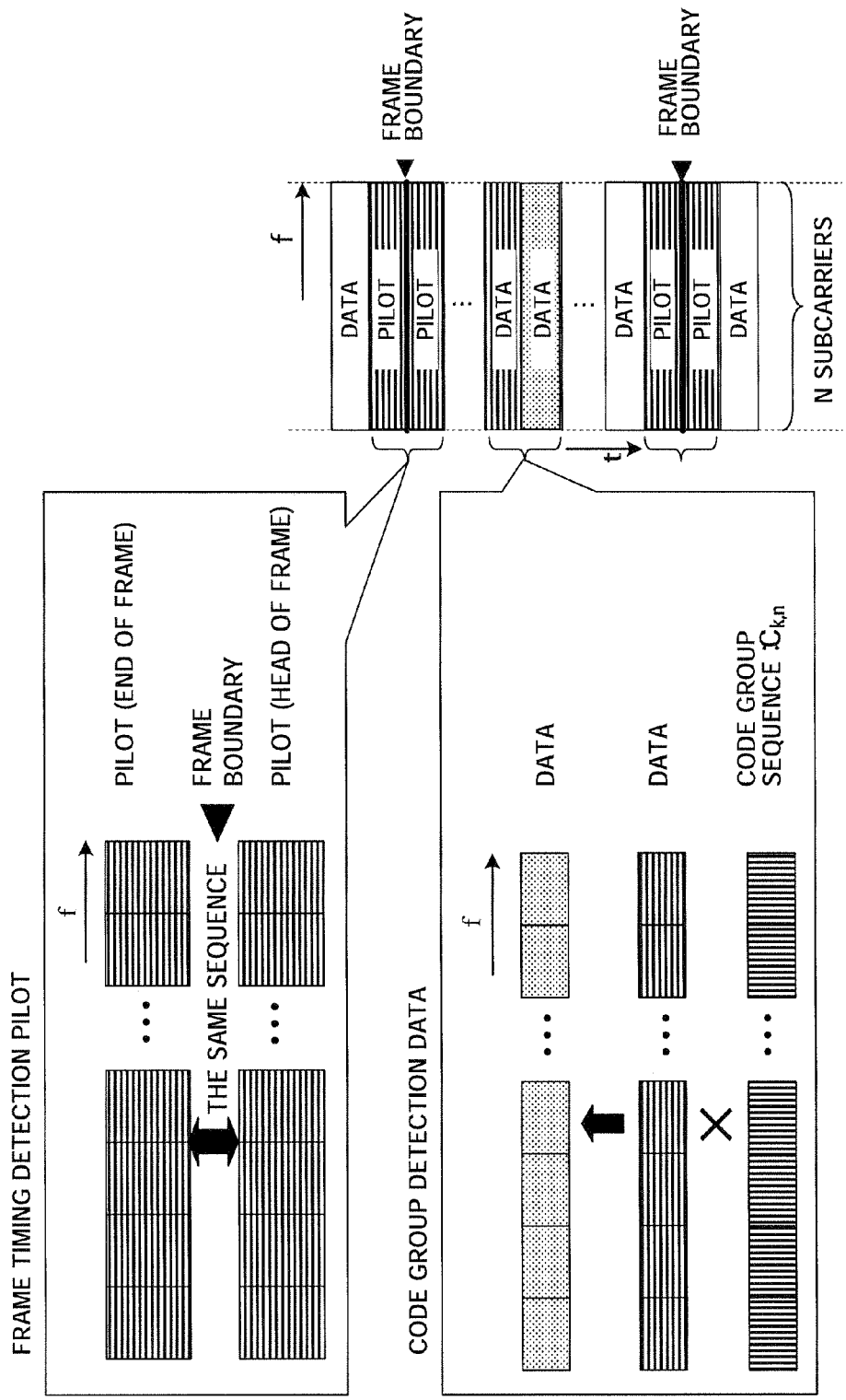
FIG. 11 is a transmission frame format of a base station apparatus according to Embodiment 2.

FIG. 11 is a transmission frame format of base station apparatus 100 according to this embodiment. The same frame timing detection pilot symbols as used in Embodiment 1 and new code group detection data (described later) are provided. As shown in FIG. 11, the symbol obtained by multiplying a certain data symbol by a code group sequence is placed in a subsequent symbol which follows the data symbol and used as code group detection data. That is, one of the neighboring data symbols on the time axis is multiplied by a code group sequence, and a frame timing detection symbol and a code group detection symbol are arranged at different positions on the time axis.

Figure 12:
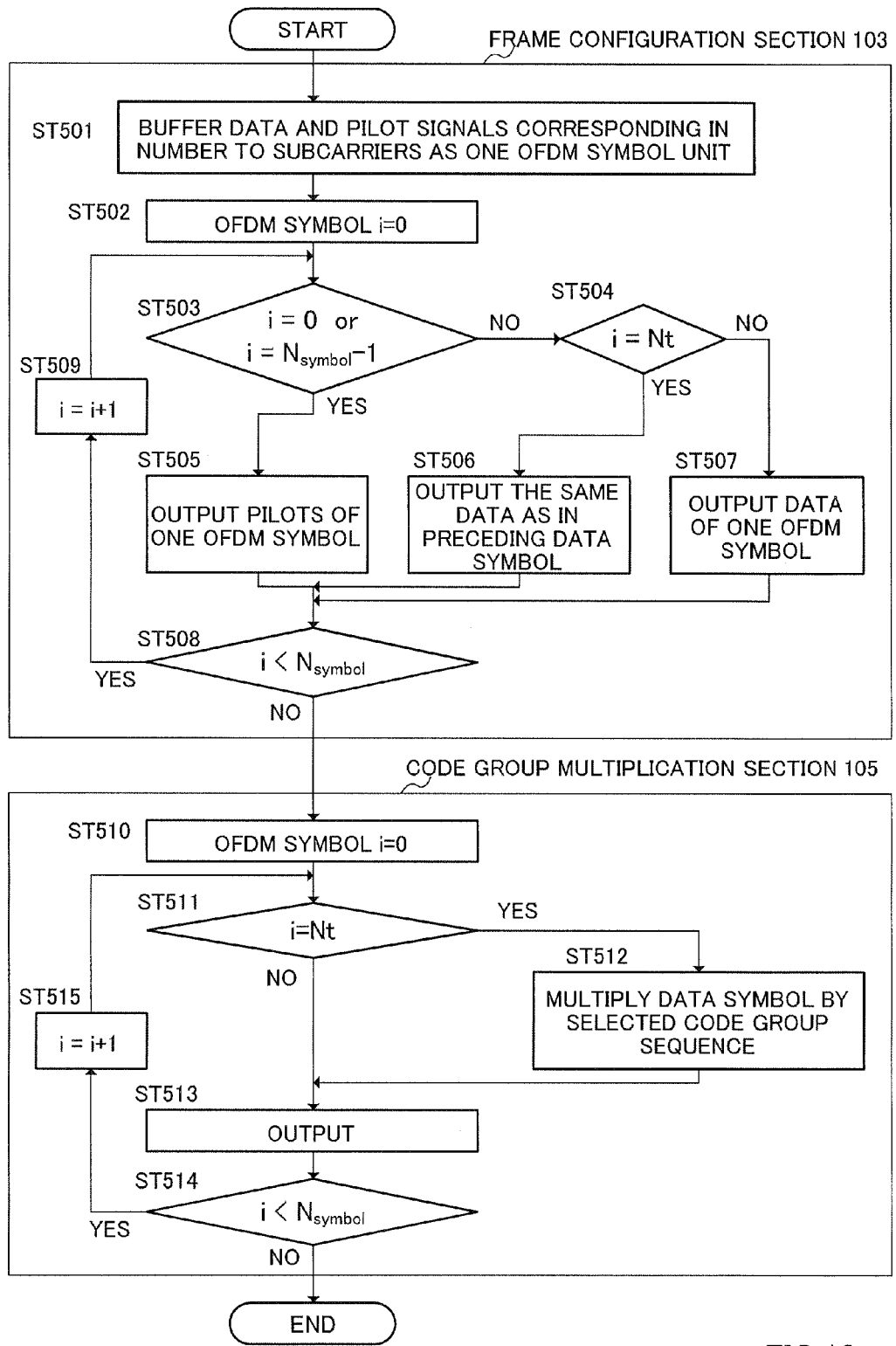
FIG. 12 is an operation flowchart of the base station apparatus according to Embodiment 2.

The configuration of base station apparatus 100 according to this embodiment is the same as in Embodiment 1 (FIG. 5). However, the operations of frame configuration section 103 and code group multiplication section 105 are different. Hereinafter, the operations of the frame configuration section 103 and code group multiplication section 105 according to this embodiment will be explained using a flowchart in FIG. 12. ST501 to 509 are processing by frame configuration section 103 and ST510 to 515 are processing by code group multiplication section 105.

In base station apparatus 100, using the transmission data and pilot signals modulated by modulation section 102 as inputs, frame configuration section 103 buffers data and pilot signals corresponding to N subcarriers on one OFDM symbol unit basis (ST501). Next, OFDM symbol number i is reset (ST502). Assume that the number of OFDM symbols per frame is $N_{symbol}$, and, when OFDM symbol number i=0 or $N_{symbol}-1$ (ST503: YES), pilot symbols of one OFDM symbol are output from frame configuration section 103 (ST505). On the other hand, when OFDM symbol number i=0 or $N_{symbol}-1$ is not the case (ST503: NO), the processing moves onto ST504. Then, when i=Nt (Nt is a specific data symbol number other than 1) (ST504: YES), data the same as in the preceding data symbol is output from frame configuration section 103 (ST506) On the other hand, when i=Nt is not the case (ST504: NO), the data of one OFDM symbol is output from frame configuration section 103 (ST507). The processing in ST503 to ST507 are repeated under a condition of i<$N_{symbol}$, assuming i=i+1 (ST508 and ST509).

After resetting OFDM symbol number i again (ST510), when the output signal of frame configuration section 103 is symbol number i=Nt (ST511: YES), the data symbol is multiplied by a code group sequence selected from the code group sequences stored in code group storage section 104 (ST512) and output from code group multiplication section 105 (ST513). When i=Nt is not the case (ST511: NO), the output signal of frame configuration section 103 is directly output from code group multiplication section 105 (ST513). The processing in ST511 to ST513 are repeated under a condition of i<$N_{symbol}$, assuming i=i+1 (ST514 and ST515). The configuration of the frame output as a result is as shown in above FIG. 11. Radio transmission section 111 transmits a frame including such a frame timing detection pilot and code group detection data to mobile station apparatus 200.

Next, the operations of mobile station apparatus 200 according to this embodiment will be explained. The configuration of mobile station apparatus 200 is the same as in Embodiment 1 (FIG. 7 and FIG. 10). However, the processing in the second stage of a cell search is different. Hereinafter, the processing in the second stage according to this embodiment will be explained using FIGS. 13A and 13B. The operation flow in the second stage is the same as in Embodiment 1 (FIG. 9).

Figure 13A:
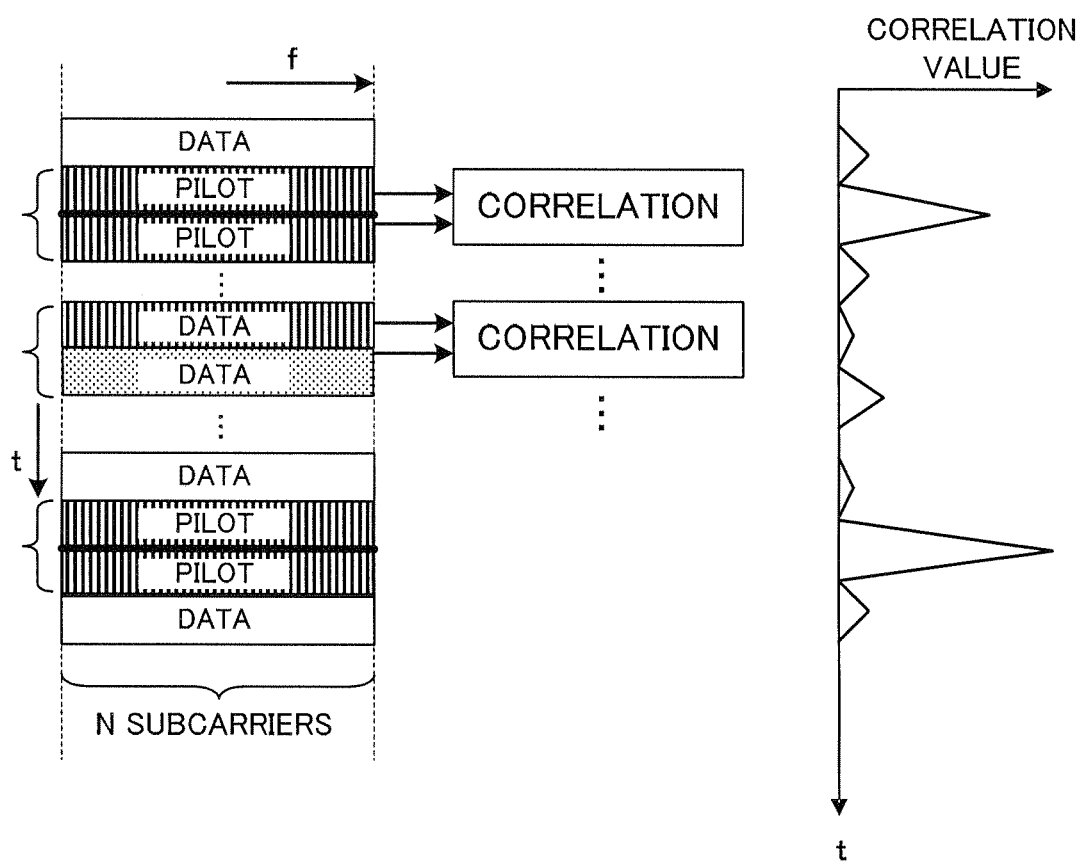
FIG. 13A shows the cell search operations by a mobile station apparatus according to Embodiment 2.

(Detection of Frame Timing: FIG. 13A)

First, according to symbol timing detected at FFT timing detection section 603, frame timing detection section 606 calculates a correlation between neighboring symbols and i+1 (ST101 and ST102). Assuming N=$N_{symbol}$, if symbol is i<$N_{symbol}$ (ST103: YES), the processing returns to ST102, assuming i=i+1 (ST104). If i<$N_{symbol}$ is not the case (ST103: NO), assume that the boundary between neighboring symbols i and i+1 that obtain the maximum correlation value in ST102 is frame timing (ST105).

Figure 13B:
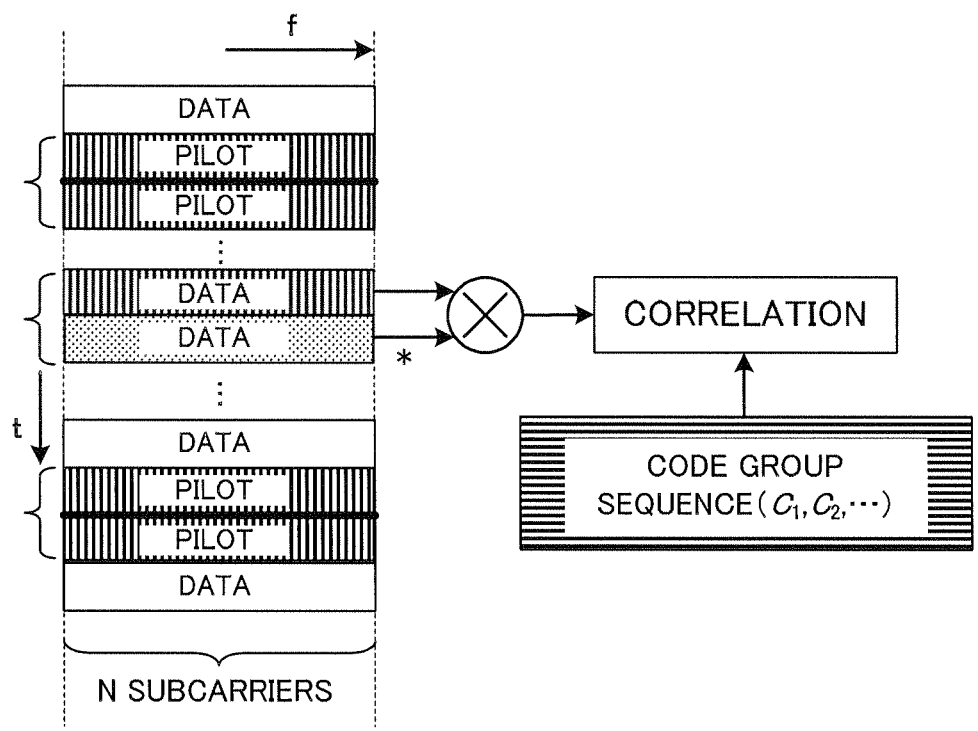
FIG. 13B shows the cell search operations by the mobile station apparatus according to Embodiment 2.

(Detection of Code Group: FIG. 13B)

According to the frame timing detected in ST105, code group detection section 608 specifies the position of the code group detection data symbol (ST106). After the specification, a complex conjugate multiplication is performed between the neighboring symbols in the code group detection data symbol, and a code group sequence is thereby extracted (ST107) A correlation between the extracted code group sequence and the code group candidate is calculated (ST108), and a candidate having a maximum correlation value is assumed to be a code group sequence (ST109).

In this way, according to this embodiment, frame timing detection processing and code group detection processing are performed in one frame, so that it is possible to reduce the amount of calculation processing in the second stage of the cell search and shorten the cell search time, thereby enabling the faster cell search.

(Embodiment 3)

Figure 14:
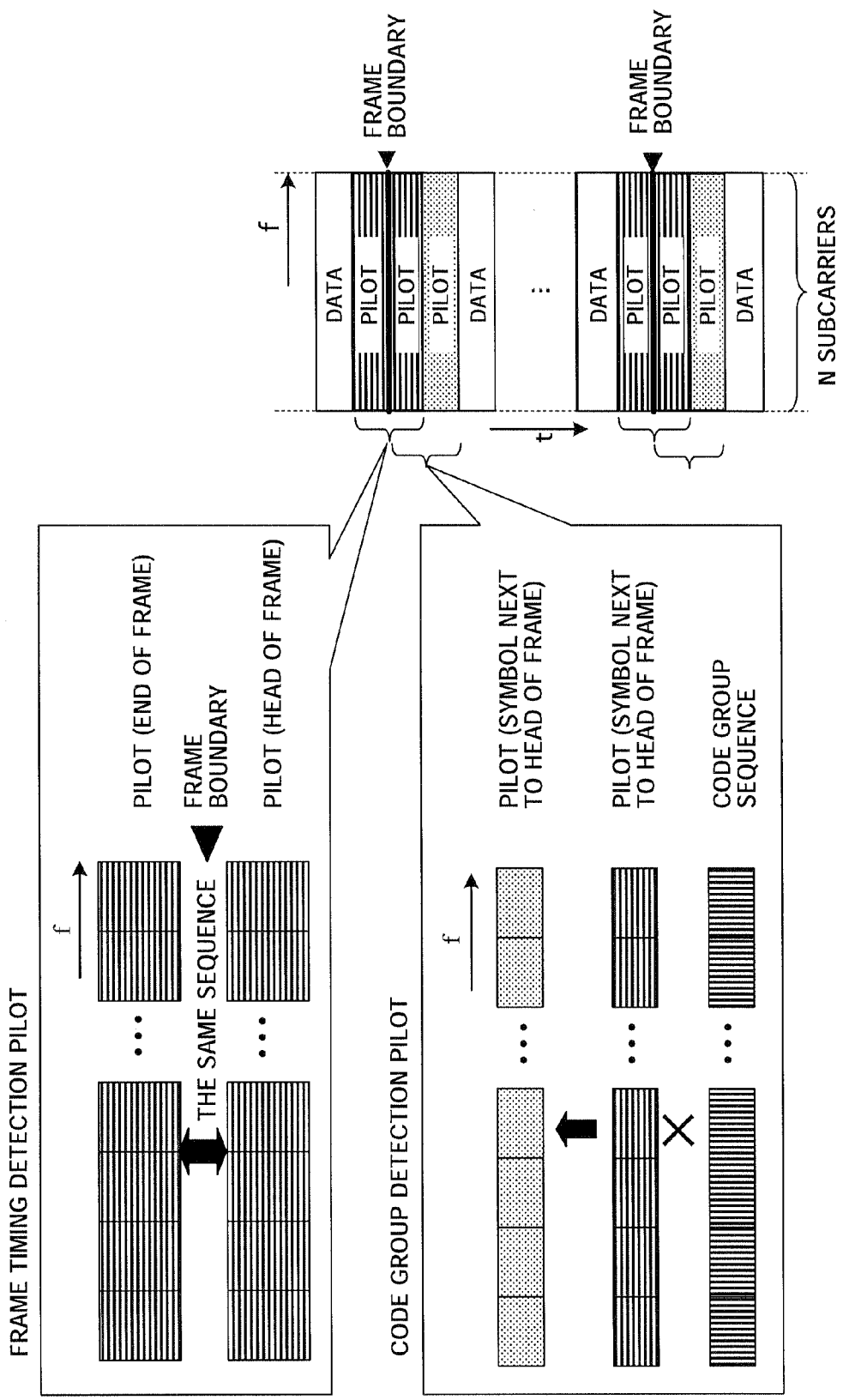
FIG. 14 is a transmission frame format of a base station apparatus according to Embodiment 3.

FIG. 14 is a transmission frame format of base station apparatus 100 according to this embodiment. The same frame timing detection pilot symbols as used in Embodiment 1 and new code group detection pilot symbols (described later) are provided. As shown in FIG. 14, assume that a symbol obtained by multiplying the pilot symbol that is next to the pilot symbol at the head of the frame among the pilot symbols of the same sequences (frame timing detection pilot symbols) neighboring each other on the frame boundary on the time axis, by a code group sequence is used as a code group detection pilot symbol.

Figure 15:
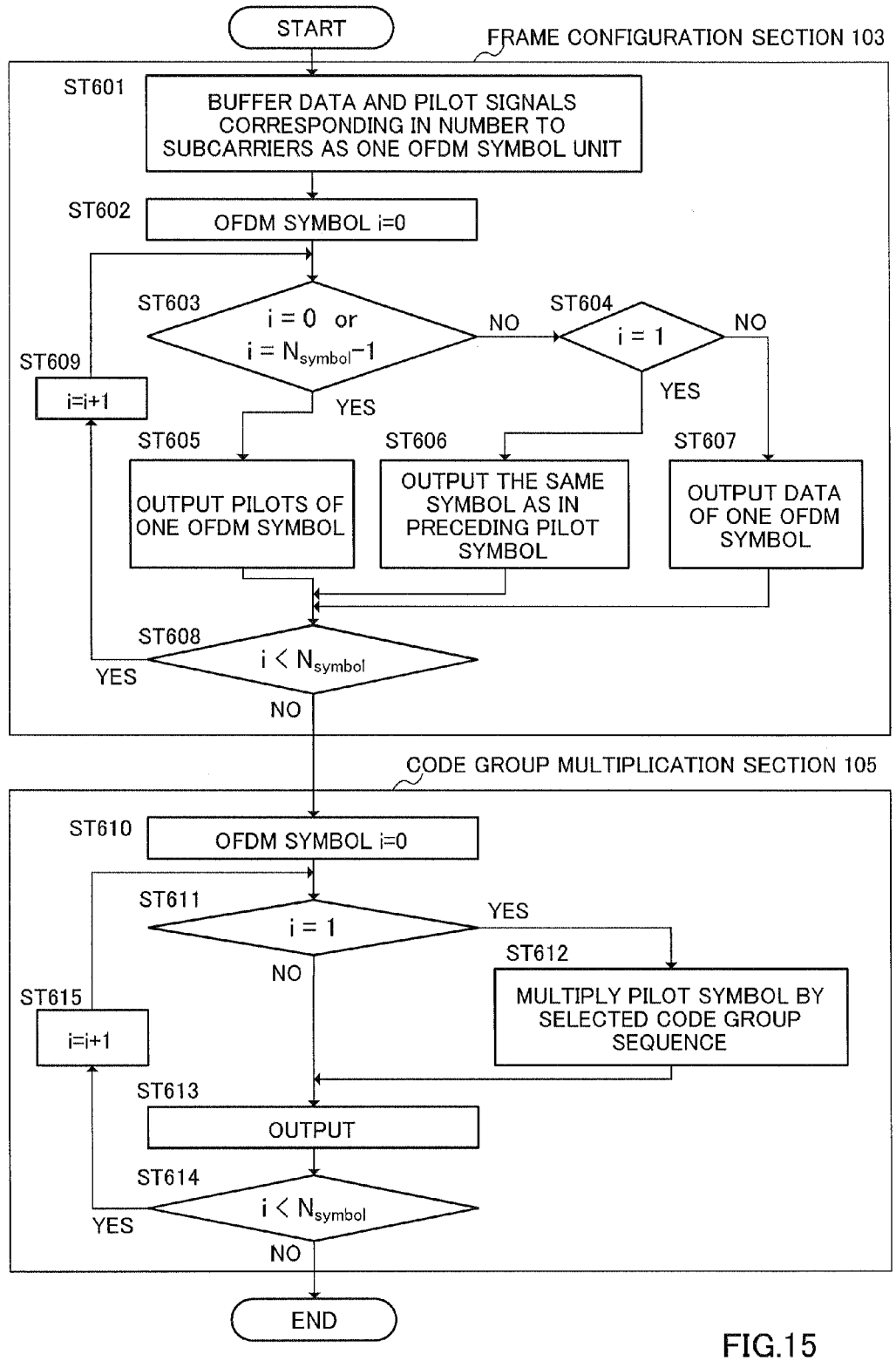
FIG. 15 is an operation flowchart of the base station apparatus according to Embodiment 3.

The configuration of base station apparatus 100 according to this embodiment is the same as in Embodiment 1 (FIG. 5). However, the operations of frame configuration section 103 and code group multiplication section 105 are different. Hereinafter, the operations of frame configuration section 103 and code group multiplication section 105 according to this embodiment will be explained using a flowchart in FIG. 15. ST601 to 609 correspond to processing at frame configuration section 103 and ST610 to 615 correspond to processing at code group multiplication section 105.

In base station apparatus 100, using the transmission data and pilot signals modulated by modulation section 102 as inputs, frame configuration section 103 buffers data and pilot signals corresponding to N subcarriers on one OFDM symbol unit basis (ST601). Next, OFDM symbol number i is reset (ST602) If the number of OFDM symbols per frame is $N_{symbol}$, when OFDM symbol number i=0 or $N_{symbol}-1$ (ST603: YES), pilot symbols of one OFDM symbol are output from frame configuration section 103 (ST605). On the other hand, when i=0 or $N_{symbol}-1$ is not the case (ST603: NO), the processing moves onto ST604. Then, when i=1 (ST604: YES), symbol the same as in the preceding pilot symbol is output from frame configuration section 103 (ST606) On the other hand, when i=1 is not the case (ST604: NO), the data of one OFDM symbol is output from frame configuration section 103 (ST607). Processing in ST603 to ST607 are repeated under a condition of i<$N_{symbol}$, assuming i=i+1 (ST608 and ST609).

After resetting OFDM symbol number i again (ST610) when the output signal of frame configuration section 103 is symbol number i=1 (ST611: YES), the pilot symbol is multiplied by a code group sequence selected from the code group sequences stored in code group storage section 104 (ST612) and is output from code group multiplication section 105 (ST613). When i=1 is not the case (ST611: NO), the output signal of frame configuration section 103 is output from code group multiplication section 105 as is (ST613). The processing in ST611 to ST613 are repeated under a condition of i<$N_{symbol}$, assuming i=i+1 (ST614 and ST615). The configuration of the frame output as a result is as shown in above FIG. 14. Radio transmission section 111 transmits a frame including such a frame timing detection pilot and a code group detection pilot to mobile station apparatus 200.

Next, the operations of mobile station apparatus 200 according to this embodiment will be explained. The configuration of mobile station apparatus 200 is the same as in Embodiment 1 (FIG. 7 and FIG. 10). However, the processing in the second stage of a cell search is different. Hereinafter, the processing in the second stage according to this embodiment will be explained using FIGS. 16A and 16B. The operation flow in the second stage is the same as in Embodiment 1 (FIG. 9).

Figure 16A:
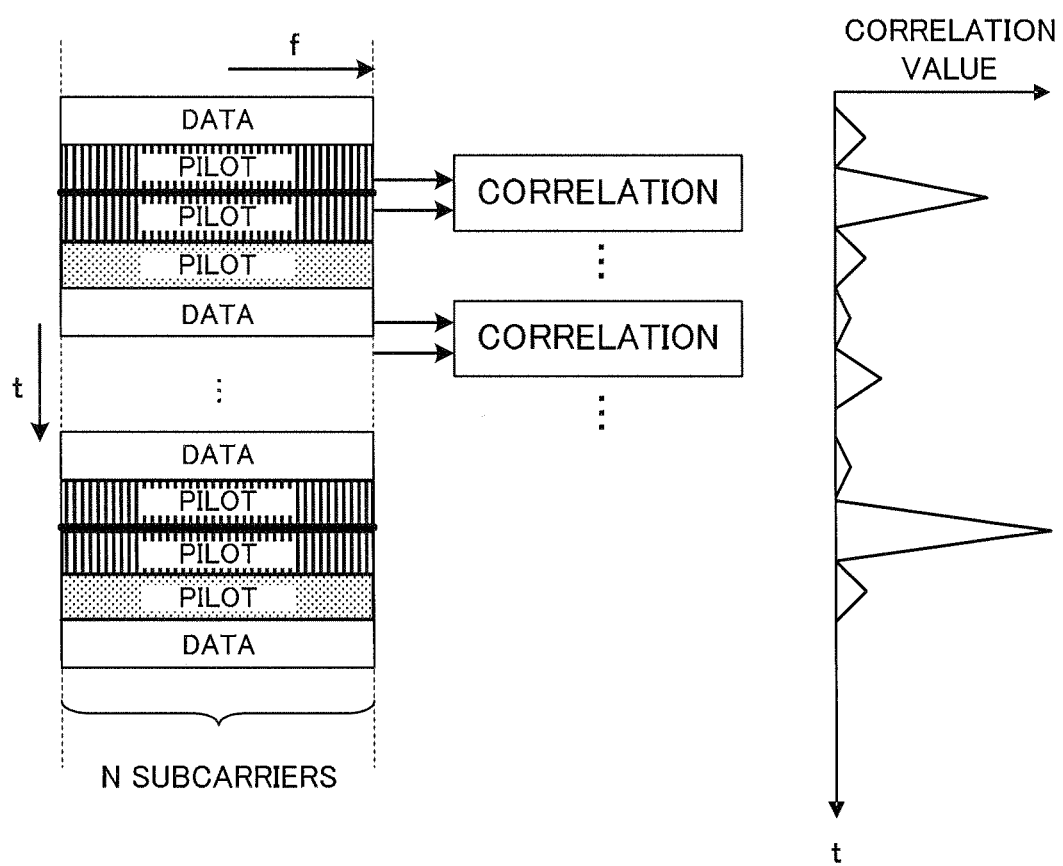
FIG. 16A shows the cell search operations by a mobile station apparatus according to Embodiment 3.

(Detection of Frame Timing: FIG. 16A)

First, according to symbol timing detected at FFT timing detection section 603, frame timing detection section 606 calculates a correlation between neighboring symbols and i+1 (ST101 and ST102). Assuming N=$N_{symbol}$, if symbol is i<$N_{symbol}$ (ST103: YES), the process returns to ST102, assuming i=i+1 (ST104). If i<$N_{symbol}$ is not the case (ST103: NO), assume that the boundary between neighboring symbols i and i+1 that obtain the maximum correlation value in ST102 is frame timing (ST105).

Figure 16B:
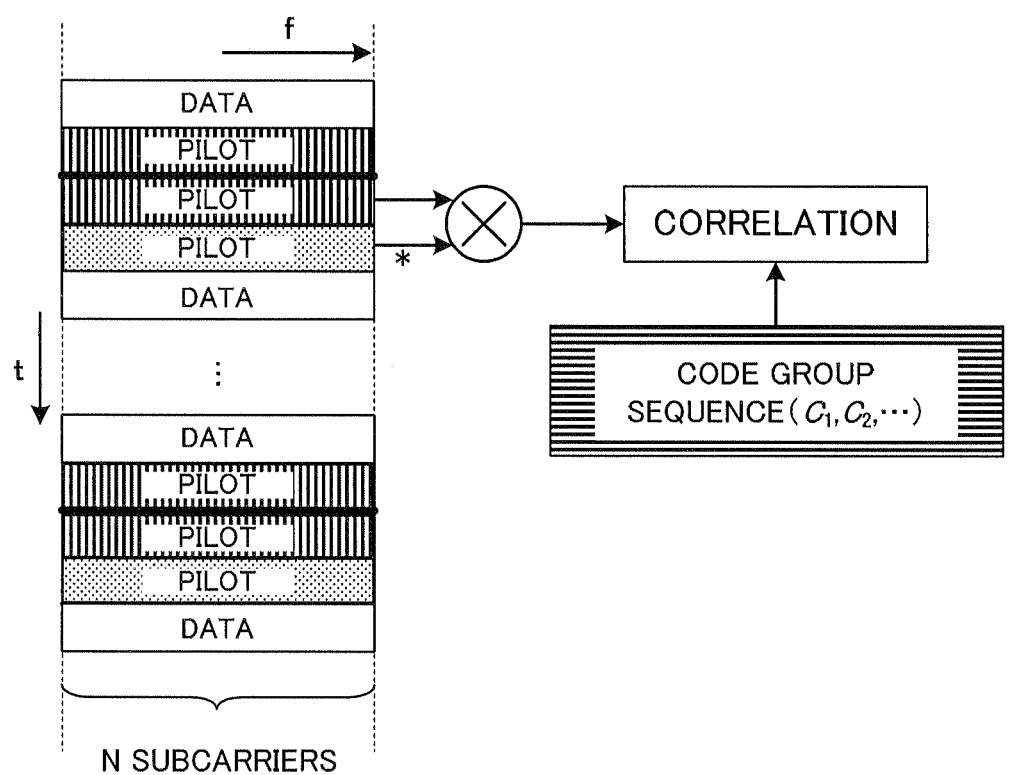
FIG. 16B shows the cell search operations by the mobile station apparatus according to Embodiment 3.

(Detection of Code Group: FIG. 16B)

According to the frame timing detected in ST105, code group detection section 608 specifies the position of the code group detection pilot symbol (ST106). After the specification, a complex conjugate multiplication is performed between the neighboring symbols in the code group detection pilot symbol, and a code group sequence is thereby extracted (ST107). A correlation between the extracted code group sequence and the code group candidate is calculated (ST108) and, assume that a candidate having a maximum correlation value is a code group sequence (ST109).

In this way, according to this embodiment, frame timing detection processing and code group detection processing are performed in one frame, so that it is possible to reduce the amount of calculation processing in the second stage of the cell search and shorten the cell search time, thereby enabling the faster cell search.

(Embodiment 4)

Figure 17:
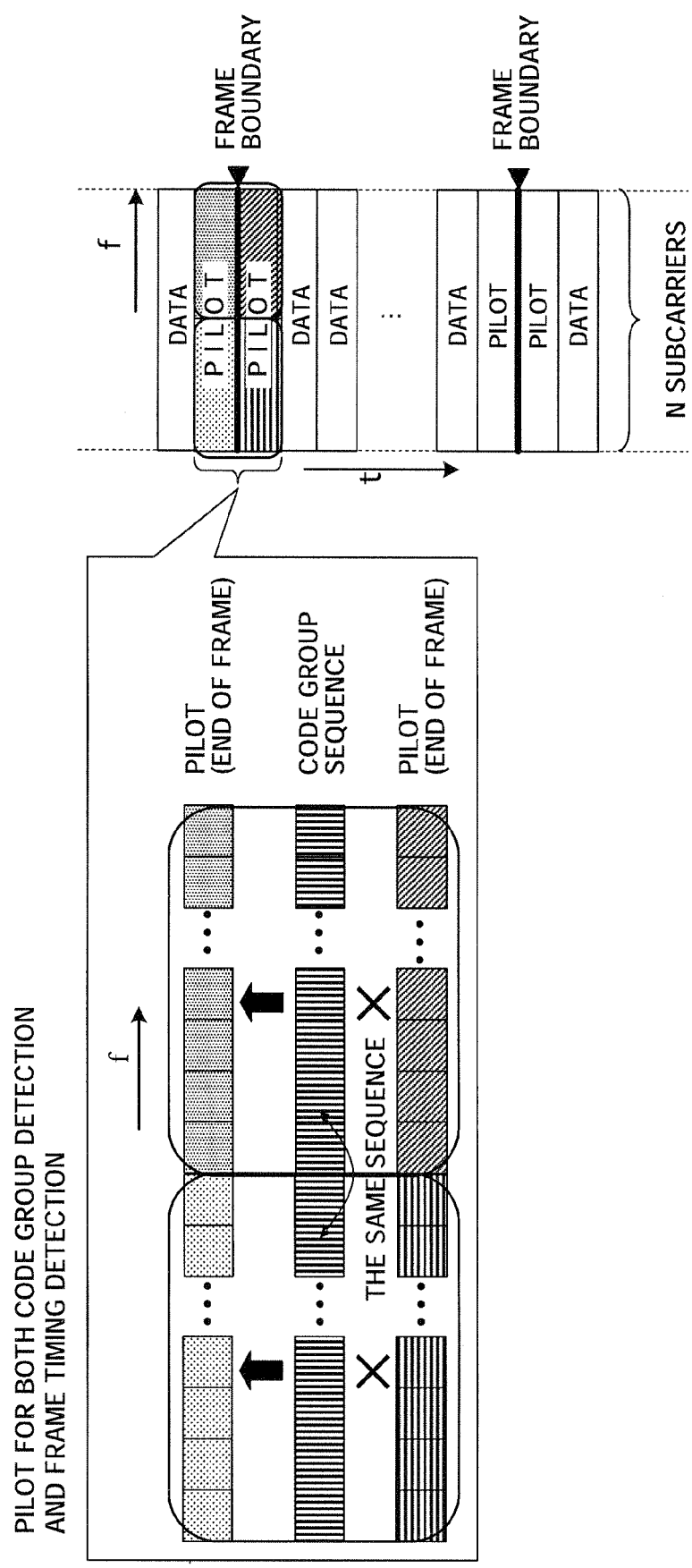
FIG. 17 is a transmission frame format of a base station apparatus according to Embodiment 4.

FIG. 17 is a transmission frame format of base station apparatus 100 according to this embodiment. With this embodiment, pilot symbol used for both code group detection and frame timing detection (described later) are provided. As shown in FIG. 17, a subcarrier having pilot symbols neighboring to each other on the frame boundary is divided into two in the frequency axis direction, both of the divided pilot symbols at the end of a frame multiplied by the same code group sequence are used as pilot symbol for both code group detection and frame timing detection. That is, pilot symbols at the head of the frame and at the end of the frame are divided into two on the frequency axis and both of the divided pilot symbols are multiplied at the end of the frame by the same code group sequence.

Figure 18:
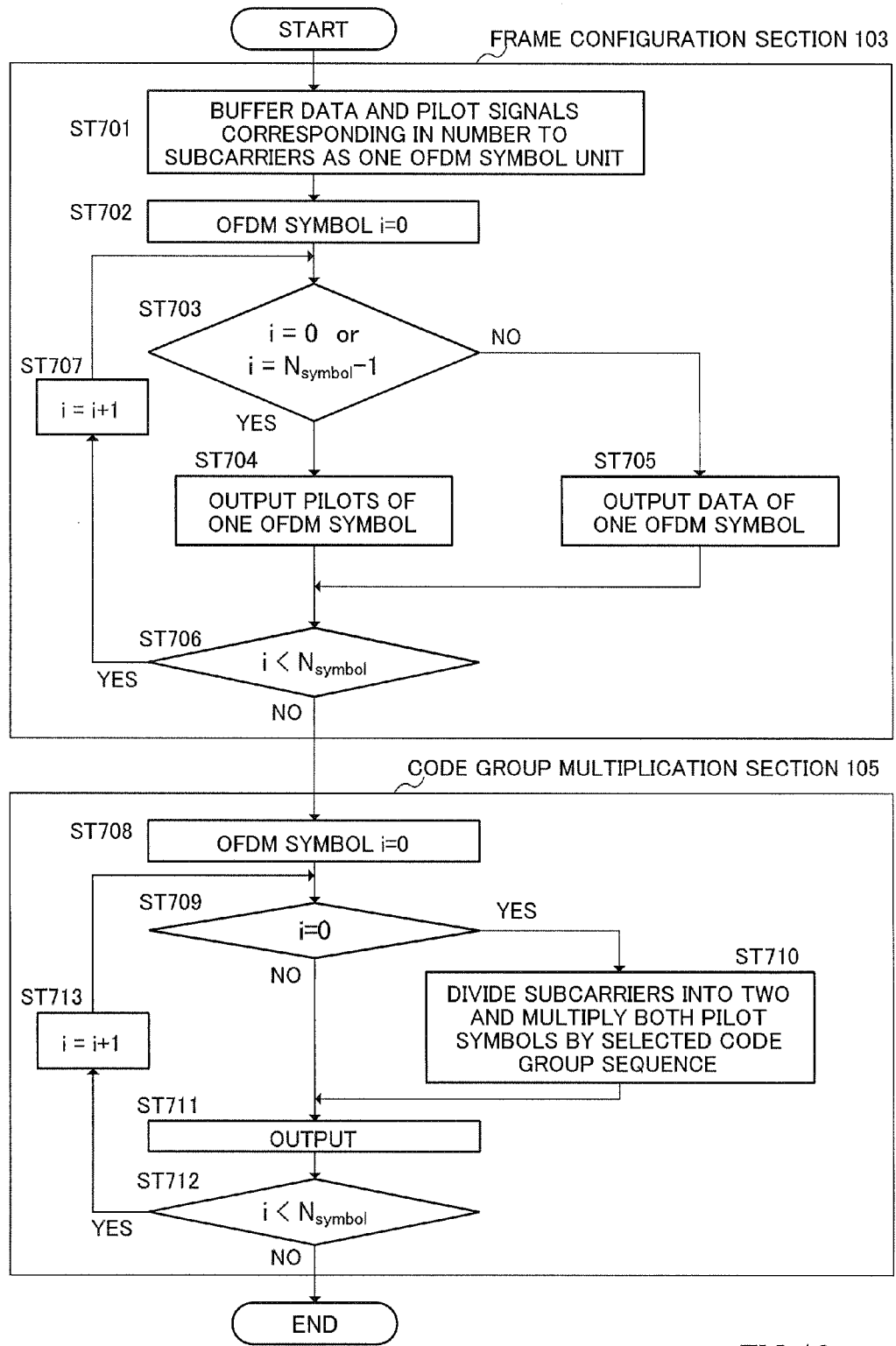
FIG. 18 is an operation flowchart of the base station apparatus according to Embodiment 4.

The configuration of base station apparatus 100 according to this embodiment is the same as in Embodiment 1 (FIG. 5). However, the operations of frame configuration section 103 and code group multiplication section 105 are different. Hereinafter, the operations of frame configuration section 103 and code group multiplication section 105 according to this embodiment will be explained using a flowchart in FIG. 18. ST701 to 707 are processing at frame configuration section 103 and ST708 to 713 are processing at code group multiplication section 105.

In base station apparatus 100, using the transmission data and pilot signals modulated by modulation section 102 as inputs, frame configuration section 103 buffers data and pilot signals corresponding to N subcarriers on one OFDM symbol unit basis (ST701). Next, OFDM symbol number i is reset (ST702). If the number of OFDM symbols per frame is $N_{symbol}$, when OFDM symbol number i=0 or $N_{symbol}-1$ (ST703: YES), pilot symbols of one OFDM symbol are output from frame configuration section 103 (ST704). On the other hand, when i=0 or $N_{symbol}-1$ is not the case (ST703: NO), data of one OFDM symbol is output from frame configuration section 103 (ST705). Processing in ST703 to ST705 are repeated under a condition of i<$N_{symbol}$, assuming i=i+1 (ST706 and ST707).

After resetting OFDM symbol number i again (ST708), when the output signal of frame configuration section 103 is symbol number i=0 (ST709: YES), the output signal of frame configuration section 103 is divided into two in subcarrier units, both pilot symbols are multiplied by a code group sequence selected from code group sequences stored in code group storage section 104 (ST710) and are output from code group multiplication section 105 (ST711) When i=0 is not the case (ST709: NO), the output signal of frame configuration section 103 is output from code group multiplication section 105 as is (ST711). The processing in ST709 to ST711 are repeated under a condition of i<$N_{symbol}$, assuming i=i+1 (ST712 and ST713). The configuration of the frame output as a result is as shown in above FIG. 17. Radio transmission section 111 transmits a frame including such pilots for both code group detection and frame timing detection to mobile station apparatus 200.

Next, the operations of mobile station apparatus 200 according to this embodiment will be explained. The configuration of mobile station apparatus 200 is the same as in Embodiment 1 (FIG. 7). However, the processing in the second stage of a cell search is different. Hereinafter, the processing in the second stage according to this embodiment will be explained using FIGS. 19A, 19B and FIG. 20.

Figure 19A:
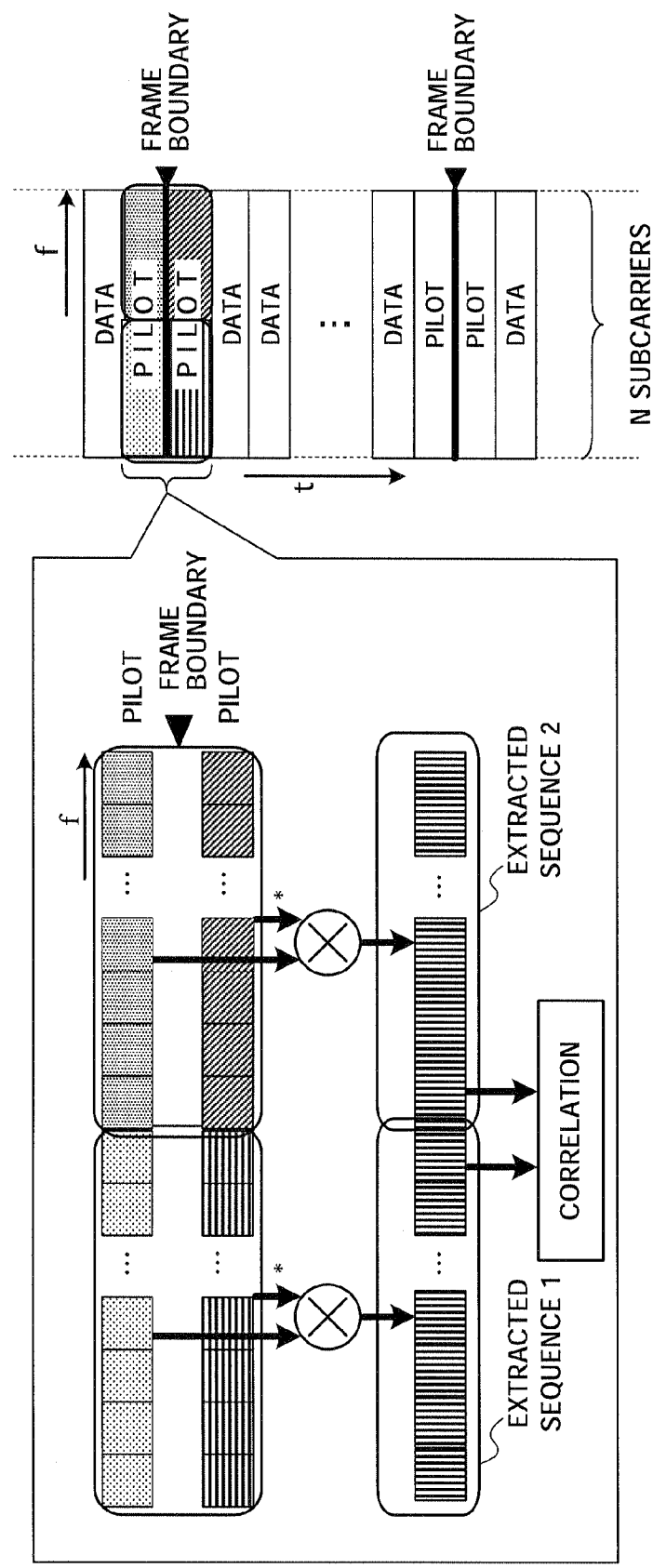
FIG. 19A shows the cell search operations by a mobile station apparatus according to Embodiment 4.

(Detection of Frame Timing: FIG. 19A)

First, according to symbol timing detected at FFT timing detection section 603, frame timing detection section 606 divides pilot symbols into two on the frequency axis in subcarrier units, performs a complex conjugate multiplication between the symbols neighboring to each other on the frame boundary and thereby extracts two sequences (ST201 and ST202). It then calculates a correlation value between the extracted code group sequences (ST203). Assuming N=$N_{symbol}$, if symbol i is i<$N_{symbol}$ (ST204: YES), the processing returns to ST202, assuming i=i+1 (ST205). If i<$N_{symbol}$ is not the case (ST204: NO), assume that the boundary between neighboring symbols i and i+1 that obtain the maximum correlation value in ST203 is frame timing (ST206).

Figure 19B:
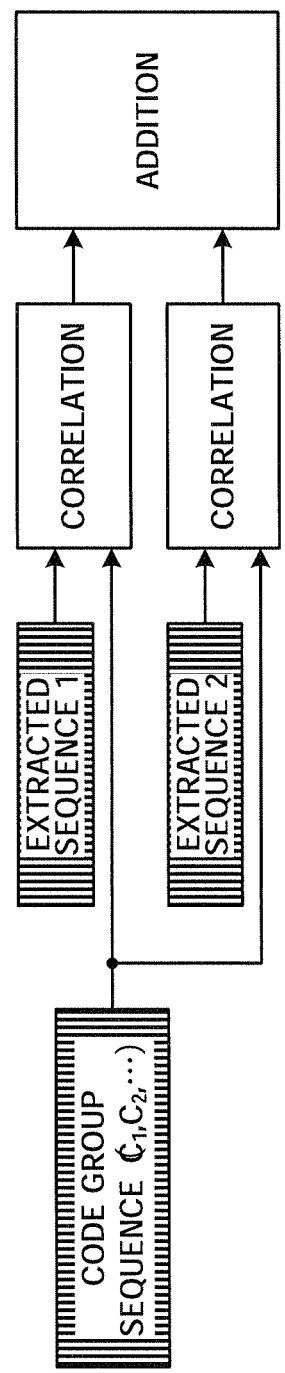
FIG. 19B shows the cell search operations by the mobile station apparatus according to Embodiment 4.

(Detection of Code Group: FIG. 19B)

The two code group sequences (extracted sequences 1 and 2) extracted in ST202 and code group sequence candidates are subjected to a correlation calculation and added (ST207), and the candidate having the maximum addition result is assumed as a code group sequence (ST208).

In this way, according to this embodiment, frame timing detection processing and code group detection processing are performed in one frame, and, therefore, it is possible to reduce the amount of calculation processing in the second stage of a cell search and shorten the cell search time, thereby enabling a faster cell search.

(Embodiment 5)

Figure 21:
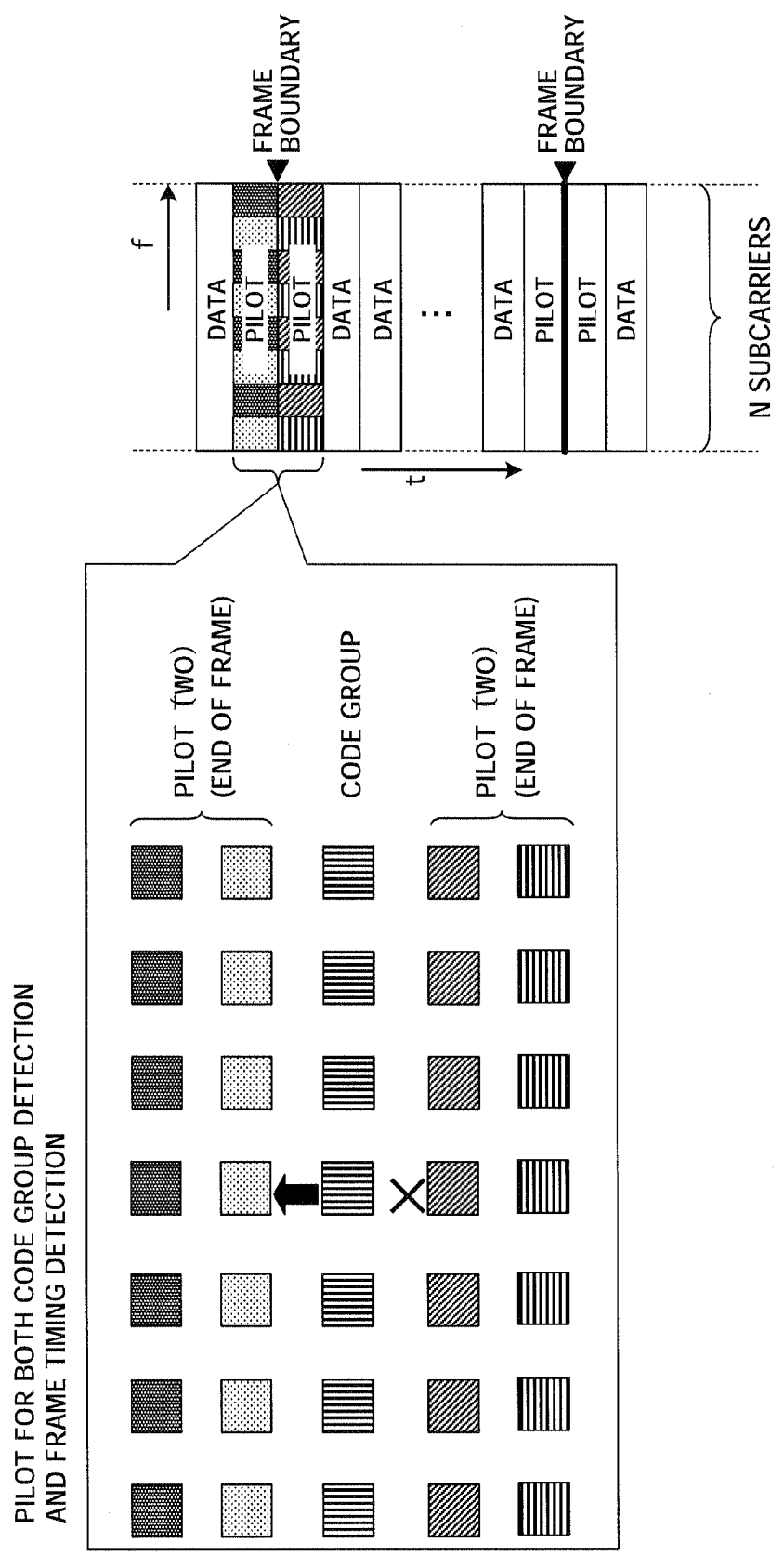
FIG. 21 is a transmission frame format of a base station apparatus according to Embodiment 5.

For Embodiment 4, in the pilot symbol configuration as shown in above FIG. 17, with a propagation path characteristic having a large frequency variation due to frequency selective fading or the like, a high correlation value is not obtained when a correlation between two-divided code group sequences is calculated, and detection accuracy of frame timing may be degraded. Therefore, with this embodiment, by adopting a frame configuration where different pilot symbols are arranged alternately in the frequency axis direction as shown in FIG. 21, the influence of a frequency variation is reduced and the accuracy of frame timing detection is improved. Furthermore, this embodiment multiplies the different pilot symbols alternately arranged on the frequency axis at the end of the frame by a code group sequence.

Figure 22:
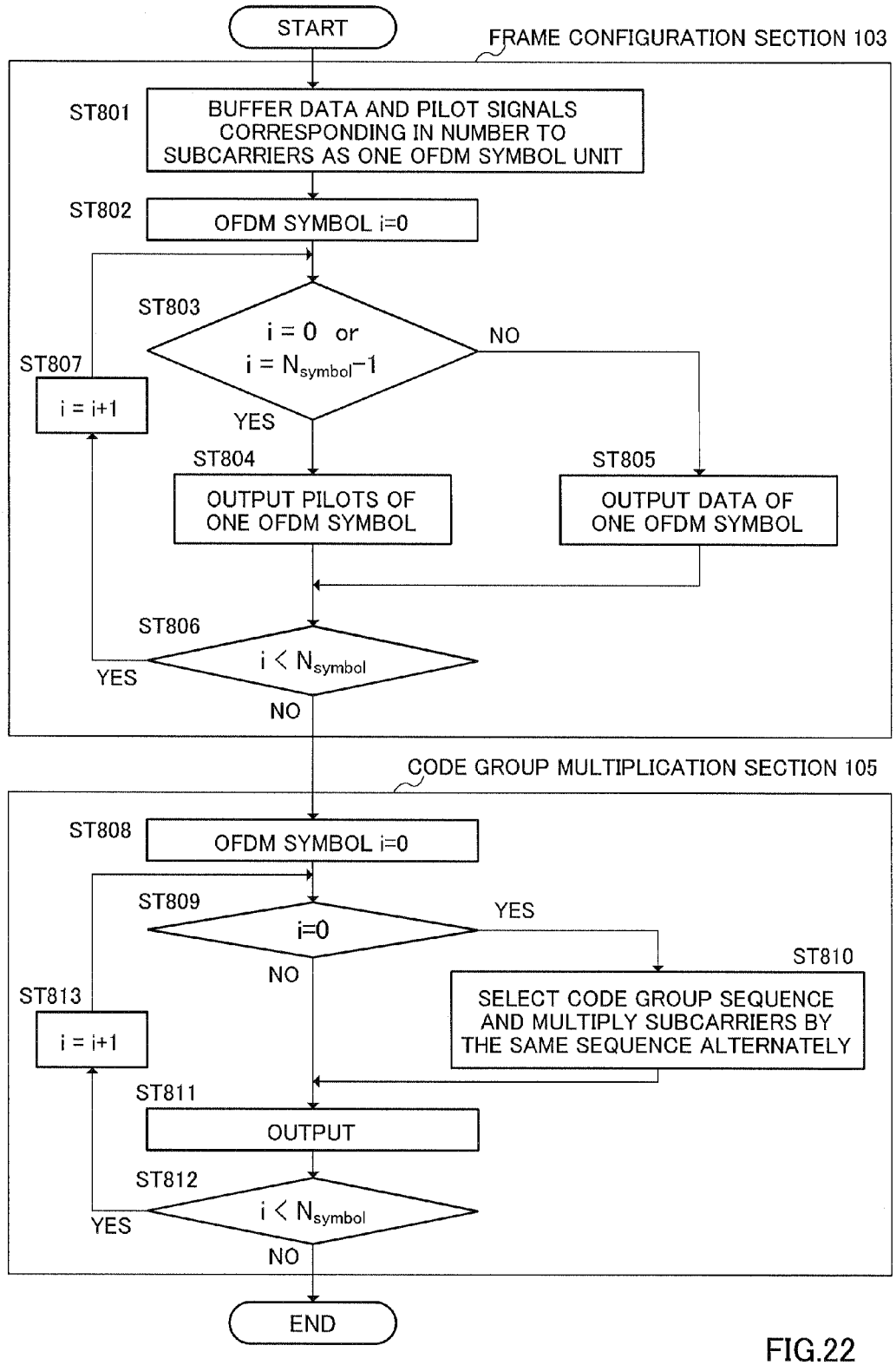
FIG. 22 is an operation flowchart of the base station apparatus according to Embodiment 5.

The configuration of base station apparatus 100 according to this embodiment is the same as in Embodiment 1 (FIG. 5). However, the operations of frame configuration section 103 and code group multiplication section 105 are different. Hereinafter, the operations of frame configuration section 103 and code group multiplication section 105 according to this embodiment will be explained using a flowchart in FIG. 22. ST801 to 807 are processing at frame configuration section 103, and ST808 to 813 are processing at code group multiplication section 105.

In base station apparatus 100, using the transmission data and pilot signals modulated by modulation section 102 as inputs, frame configuration section 103 buffers data and pilot signals corresponding to N subcarriers on one OFDM symbol unit basis (ST801). Next, OFDM symbol number i is reset (ST802) If the number of OFDM symbols per frame is $N_{symbol}$, when OFDM symbol number i=0 or $N_{symbol}$–1 (ST803: YES), pilot symbols of one OFDM symbol are output from frame configuration section 103 (ST804). On the other hand, when i=0 or $N_{symbol}$–1 is not the case (ST803: NO), data of one OFDM symbol is output from frame configuration section 103 (ST805). Processing in ST803 to ST805 are repeated under a condition of i<$N_{symbol}$, assuming i=i+1 (ST806 and ST807).

After resetting OFDM symbol number i again (ST808), when the output signal of frame configuration section 103 is symbol number i=0 (ST809: YES), subcarriers are alternately multiplied by the same code group sequence selected from the code group sequences stored in code group storage section 104 (ST810) and is output from code group multiplication section 105 (ST811). When i=0 is not the case (ST809: NO), the output signal of frame configuration section 103 is output as is from code group multiplication section 105 (ST811). The processing in ST809 to ST811 are repeated under a condition of i<$N_{symbol}$, assuming i=i+1 (ST812 and ST813). The configuration of the frame output as a result is as shown in above FIG. 21. Radio transmission section 111 transmits a frame including such pilots for both code group detection and frame timing detection to mobile station apparatus 200.

Figure 20:
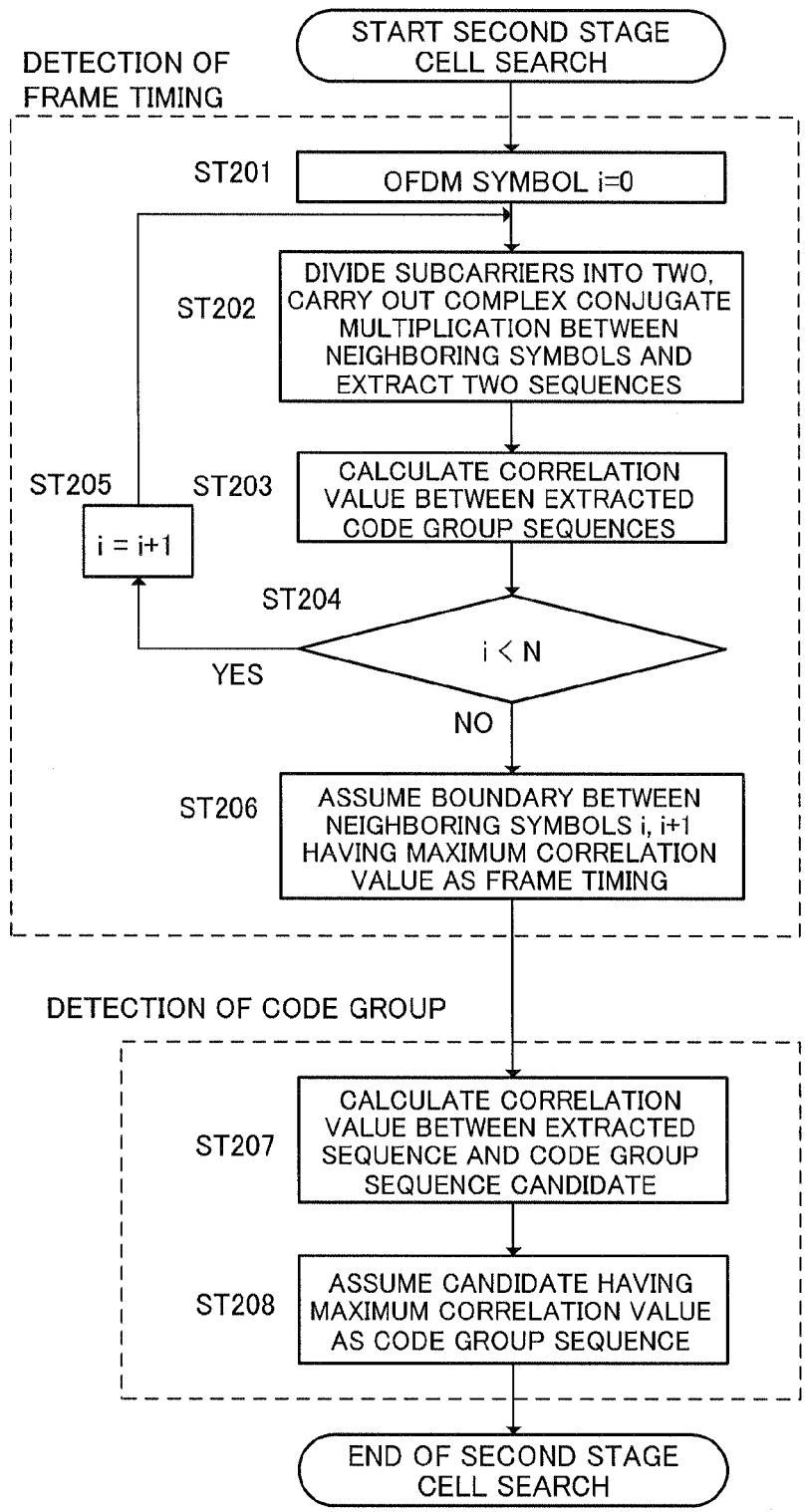
FIG. 20 is an operation flowchart of the mobile station apparatus according to Embodiment 4.

Next, the operations of mobile station apparatus 200 according to this embodiment will be explained. The configuration of mobile station apparatus 200 is the same as in Embodiment 1 (FIG. 7). However, the processing in the second stage of a cell search is different. Hereinafter, the processing in the second stage according to this embodiment will be explained using FIG. 23. The detection of a code group and the operation flow in the second stage are the same as in Embodiment 4 (FIG. 19B and FIG. 20).

Figure 23:
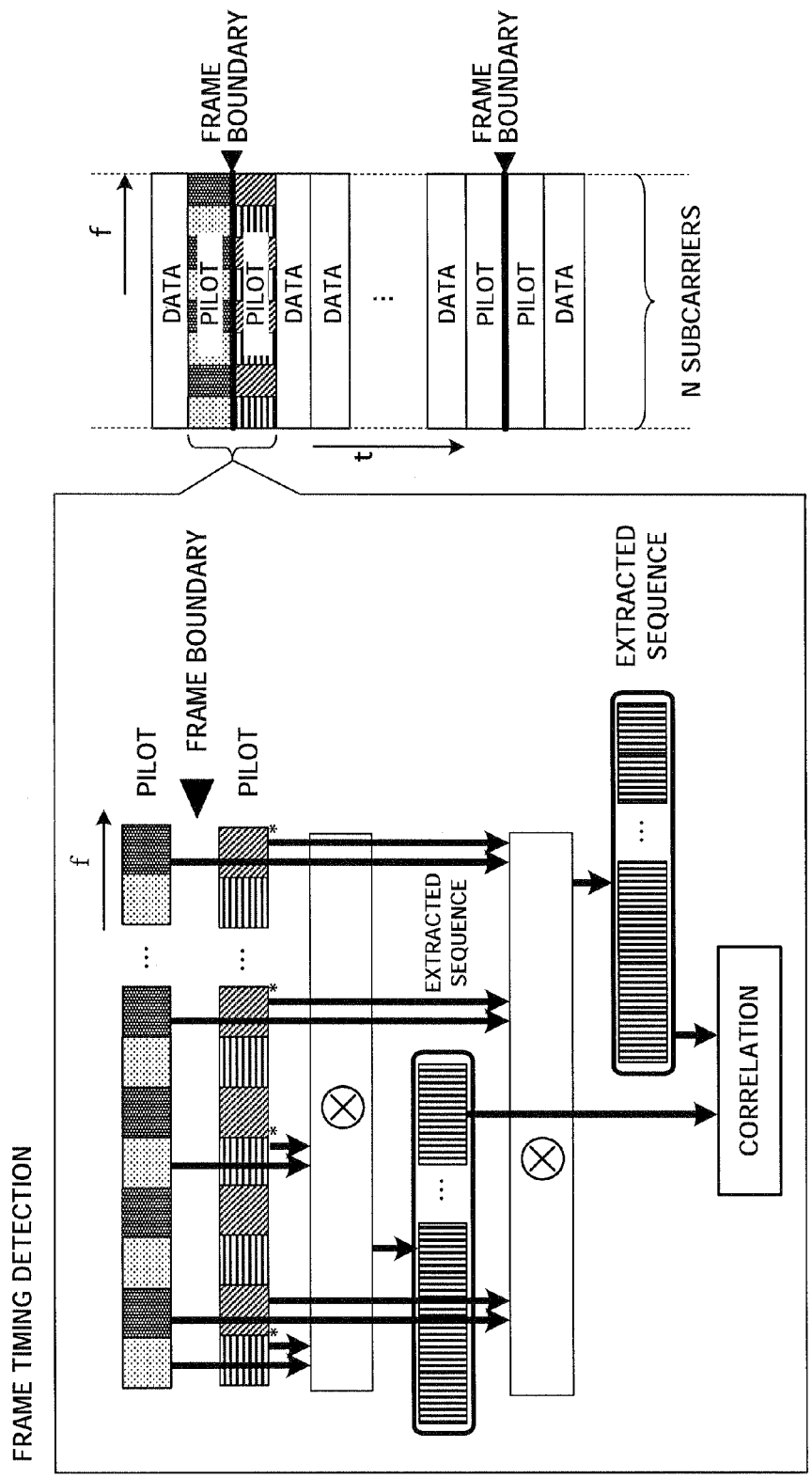
FIG. 23 shows the cell search operations by a mobile station apparatus according to Embodiment 5.

(Detection of Frame Timing: FIG. 23)

First, according to symbol timing detected at FFT timing detection section 603, frame timing detection section 606 extracts subcarriers alternately and performs a complex conjugate multiplication between neighboring symbols, thereby extracting two sequences (ST201 and ST202). It then calculates a correlation between the extracted code group sequences (ST203). Assuming N=$N_{symbol}$, if symbol i is i<$N_{symbol}$ (ST204: YES), the processing returns to ST202, assuming i=i+1 (ST205). If i<$N_{symbol}$ is not the case (ST204: NO), assume that the boundary between neighboring symbols i and i+1 that obtain the maximum correlation value in ST203 is frame timing (ST206).

In this way, according to this embodiment, frame timing detection processing and code group detection processing are performed in one frame, so that it is possible to reduce the amount of calculation processing in the second stage of the cell search and shorten the cell search time, thereby enabling the faster cell search. Furthermore, compared to Embodiment 4, it is possible to increase resistance to the propagation path characteristic having a large frequency variation due to frequency selective fading or the like.

(Embodiment 6)

Figure 24:
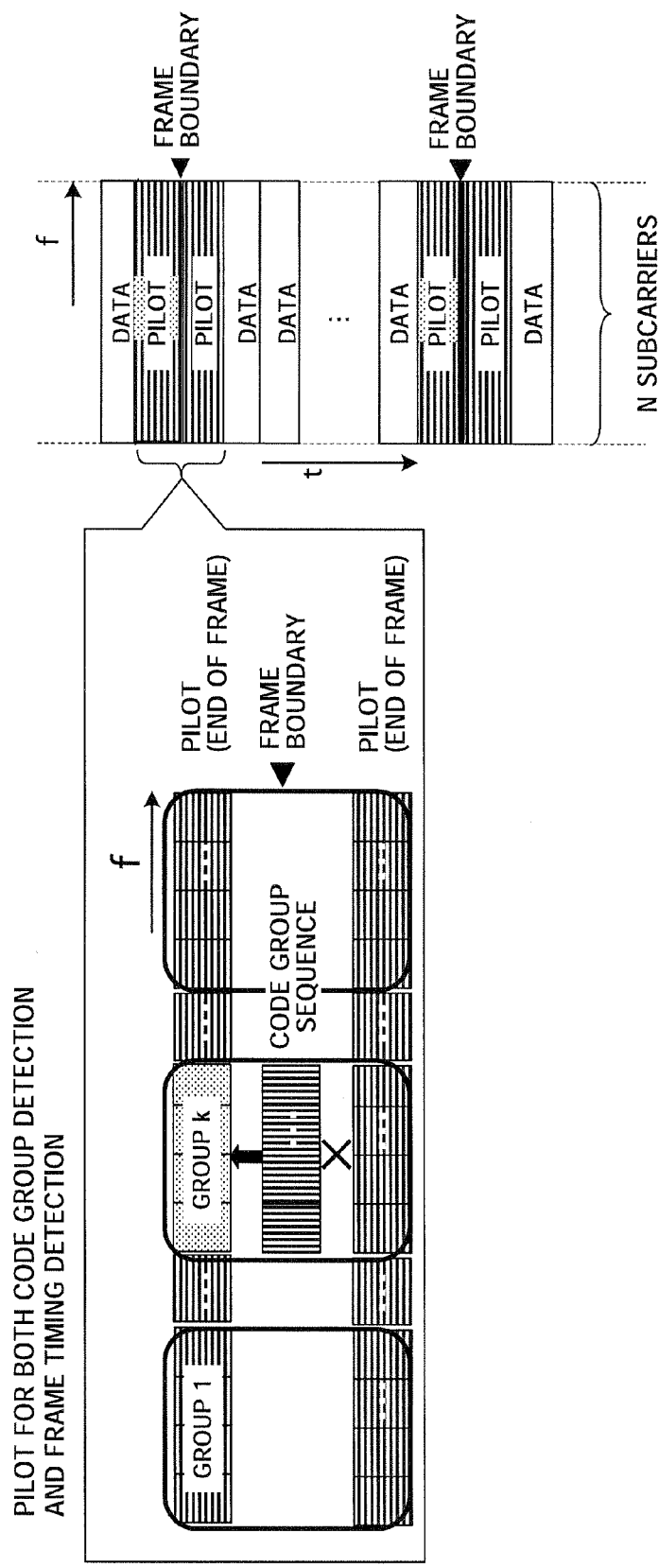
FIG. 24 is a transmission frame format of a base station apparatus according to Embodiment 6.

FIG. 24 is a transmission frame format of base station apparatus 100 according to this embodiment. With this embodiment, pilot symbol for both code group detection and frame timing detection (described later) are provided. As shown in FIG. 24, all subcarriers of neighboring pilot symbols on the frame boundary are divided into subcarrier blocks corresponding in number to code groups on the frequency axis. Assume that symbols obtained by multiplying a subcarrier block corresponding to a code group number at the end of a frame by a code group sequence are pilot symbols for both code group detection and frame timing detection.

Figure 25:
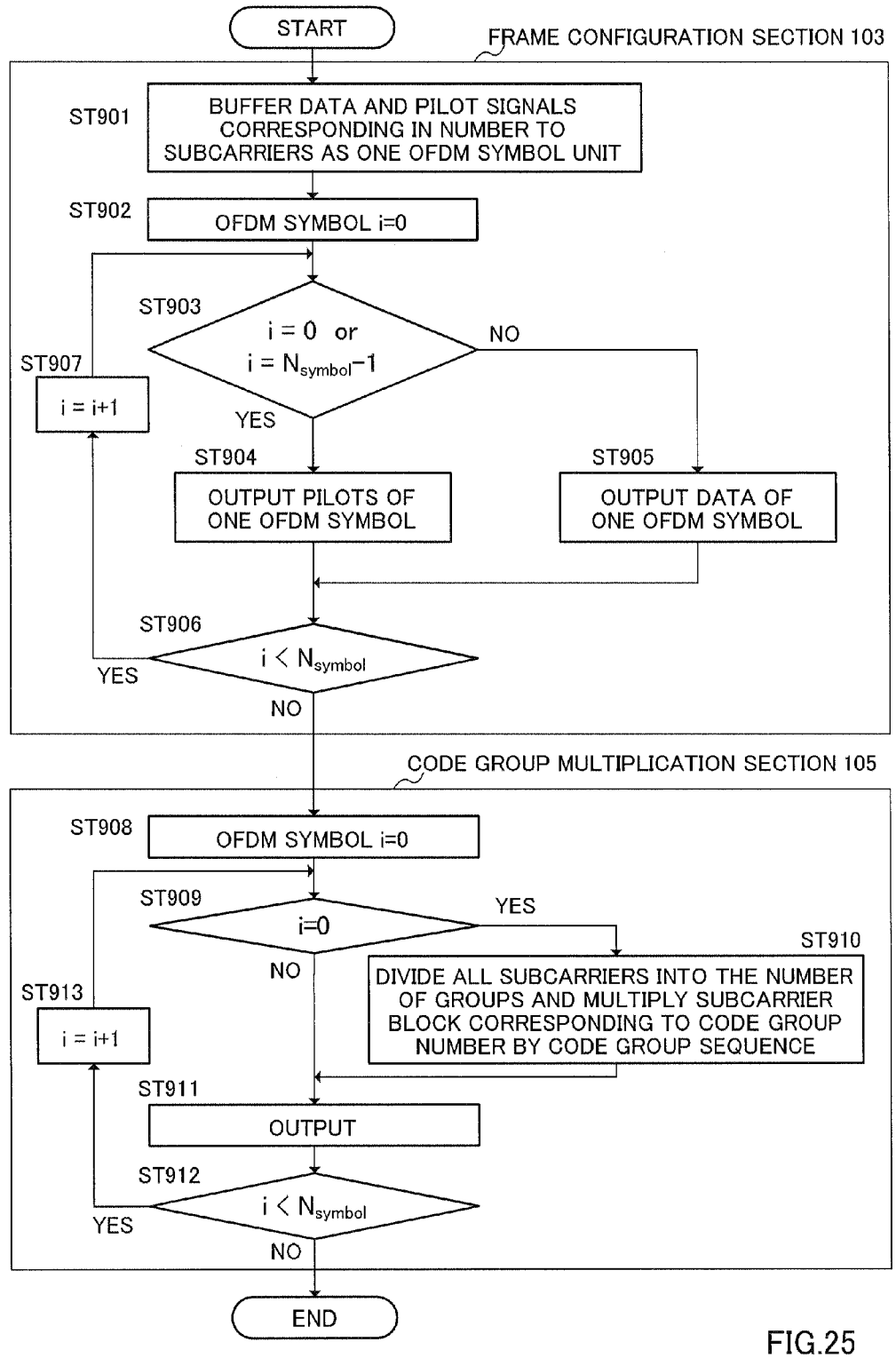
FIG. 25 is an operation flowchart of the base station apparatus according to Embodiment 6.

The configuration of base station apparatus 100 according to this embodiment is the same as in Embodiment 1 (FIG. 5). However, the operations of frame configuration section 103 and code group multiplication section 105 are different. Hereinafter, the operations of frame configuration section 103 and code group multiplication section 105 according to this embodiment will be explained using a flowchart in FIG. 25. ST901 to 907 are processing at frame configuration section 103 and ST908 to 913 are processing at code group multiplication section 105.

In base station apparatus 100, using the transmission data and pilot signals modulated by modulation section 102 as inputs, frame configuration section 103 buffers data and pilot signals corresponding to N subcarriers on one OFDM symbol unit basis (ST901). Next, OFDM symbol number i is reset (ST902). If the number of OFDM symbols per frame is $N_{symbol}$, when OFDM symbol number i=0 or $N_{symbol}$–1 (ST903: YES), pilot symbols of one OFDM symbol are output from frame configuration section 103 (ST904). On the other hand, when i=0 or $N_{symbol}$–1 is not the case (ST903: NO), data of one OFDM symbol is output from frame configuration section 103 (ST905). Processing in ST903 to ST905 are repeated under a condition of i<$N_{symbol}$, assuming i=i+1 (ST906 and ST907).

After resetting OFDM symbol number i again (ST908) when the output signal of frame configuration section 103 is symbol number i=1 (ST909: YES), all subcarriers are divided into the number of groups, and a subcarrier block corresponding to a code group number is multiplied by a code group sequence (always the same sequence) stored in code group storage section 104 (ST910). The multiplication result is then output from code group multiplication section 105 (ST911). When i=0 is not the case (ST909: NO), the output signal of frame configuration section 103 is output as is from code group multiplication section 105 (ST911). The processing in ST909 to ST911 are repeated under a condition of i<$N_{symbol}$, assuming i=i+1 (ST912 and ST913). The configuration of the frame output as a result is as shown in above FIG. 24. Radio transmission section 111 transmits a frame including such pilots for both code group detection and frame timing detection to mobile station apparatus 200.

Next, the operations of mobile station apparatus 200 according to this embodiment will be explained. The configuration of mobile station apparatus 200 is the same as in Embodiment 1 (FIG. 7). However, the processing in the second stage of a cell search is different. Hereinafter, the processing in the second stage according to this embodiment will be explained using FIG. 26A, 26B and FIG. 27.

Figure 26A:
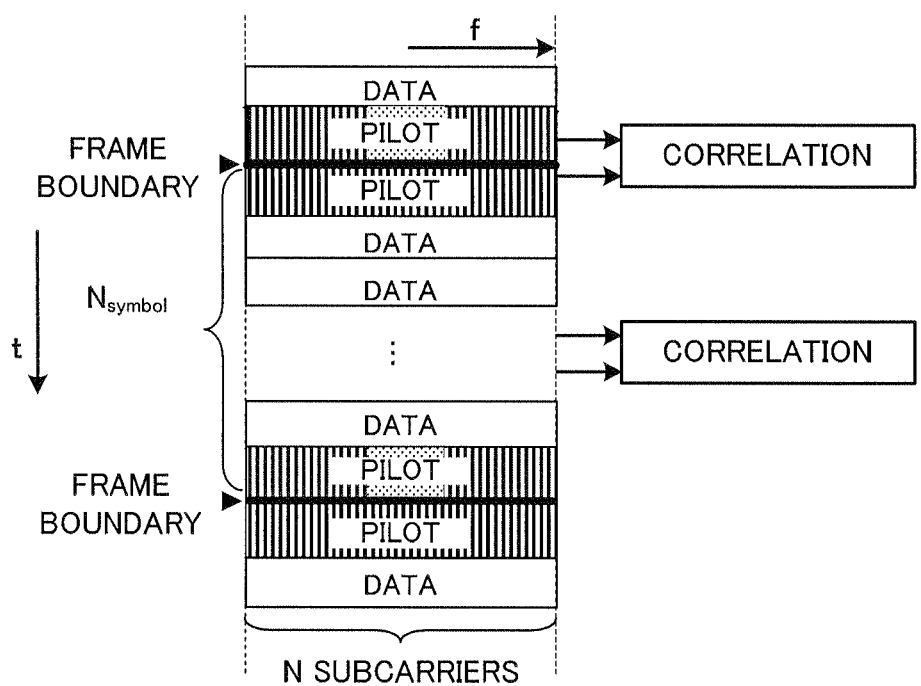
FIG. 26A shows the cell search operations by a mobile station apparatus according to Embodiment 6.
Figure 27:
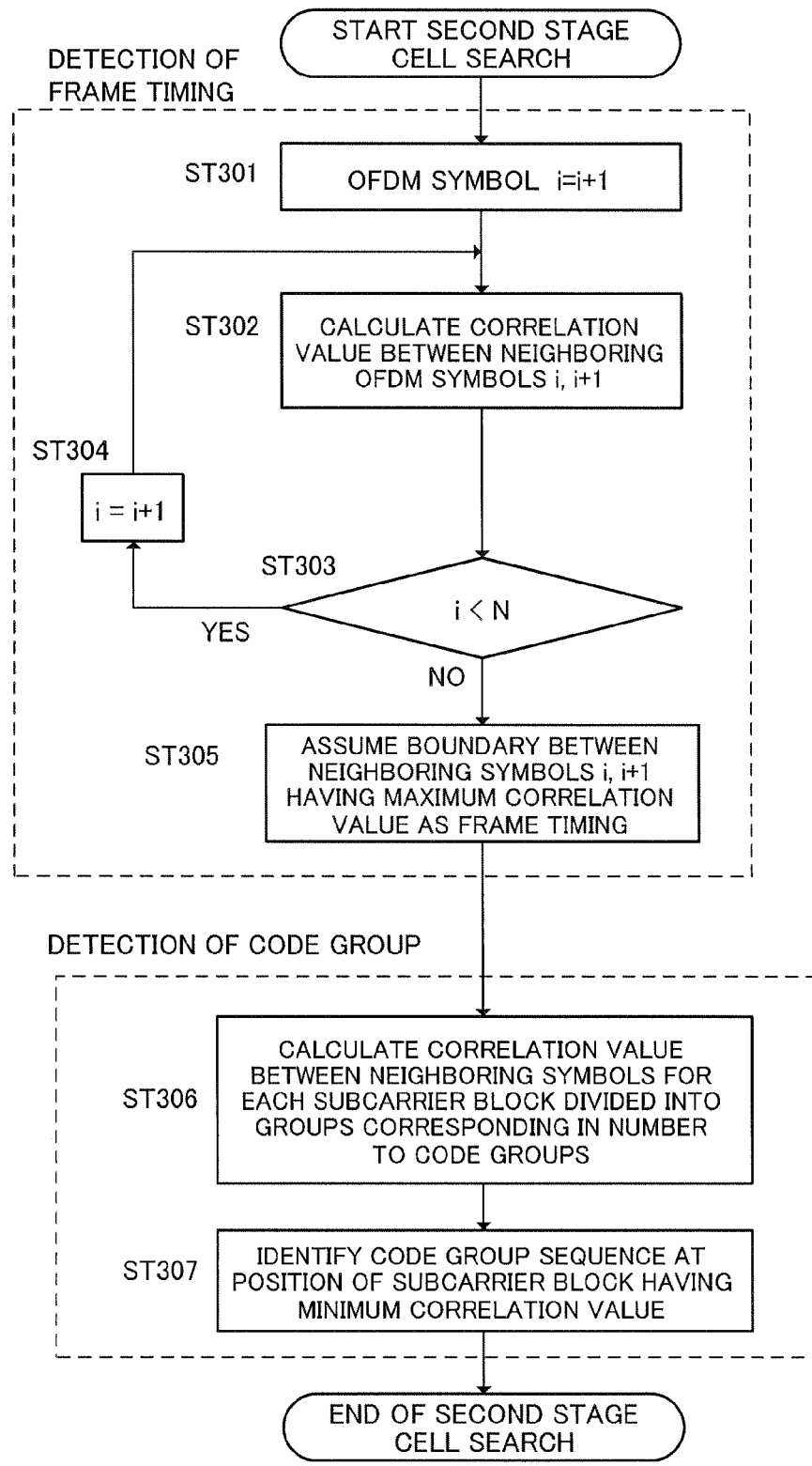
FIG. 27 is an operation flowchart of the mobile station apparatus according to Embodiment 6.

(Detection of Frame Timing: FIG. 26A)

First, according to symbol timing detected at FFT timing detection section 603, frame timing detection section 606 calculates a correlation value between neighboring symbols i and i+1 (ST301 and ST302). Assuming N=$N_{symbol}$, if symbol i is i<$N_{symbol}$ (ST303: YES), the processing returns to ST302, assuming i=i+1 (ST304) If i<$N_{symbol}$ is not the case (ST303: NO), assume that the boundary between neighboring symbols i and i+1 that obtain the maximum correlation value in ST302 is frame timing (ST305).

Figure 26B:
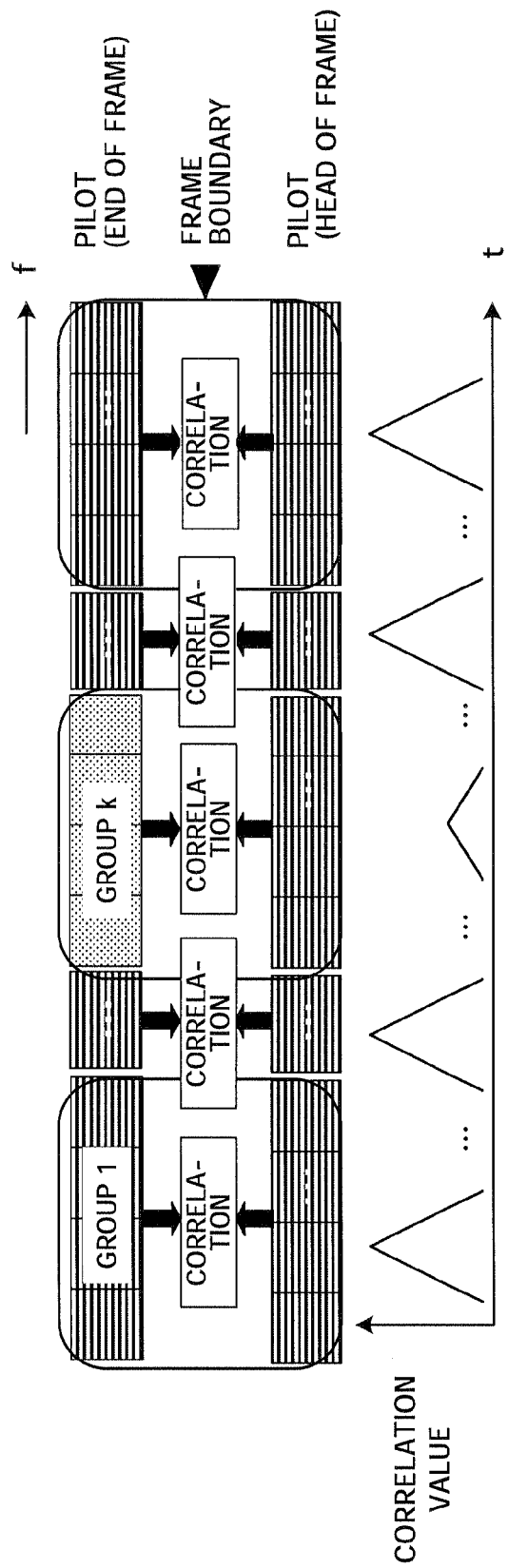
FIG. 26B shows the cell search operations by the mobile station apparatus according to Embodiment 6.

(Detection of Code Group: FIG. 26B)

According to the frame timing detected in ST305, code group detection section 608 calculates a correlation value among neighboring symbols in the frame boundaries per subcarrier block (ST306). Then, it detects a code group sequence in accordance with the position of a subcarrier block which has a minimum correlation value (ST307).

In this way, according to this embodiment, frame timing detection processing and code group detection processing are performed in one frame, so that it is possible to reduce the amount of calculation processing in the second stage of the cell search and shorten the cell search time, thereby enabling the faster cell search.

(Embodiment 7)

Figure 28:
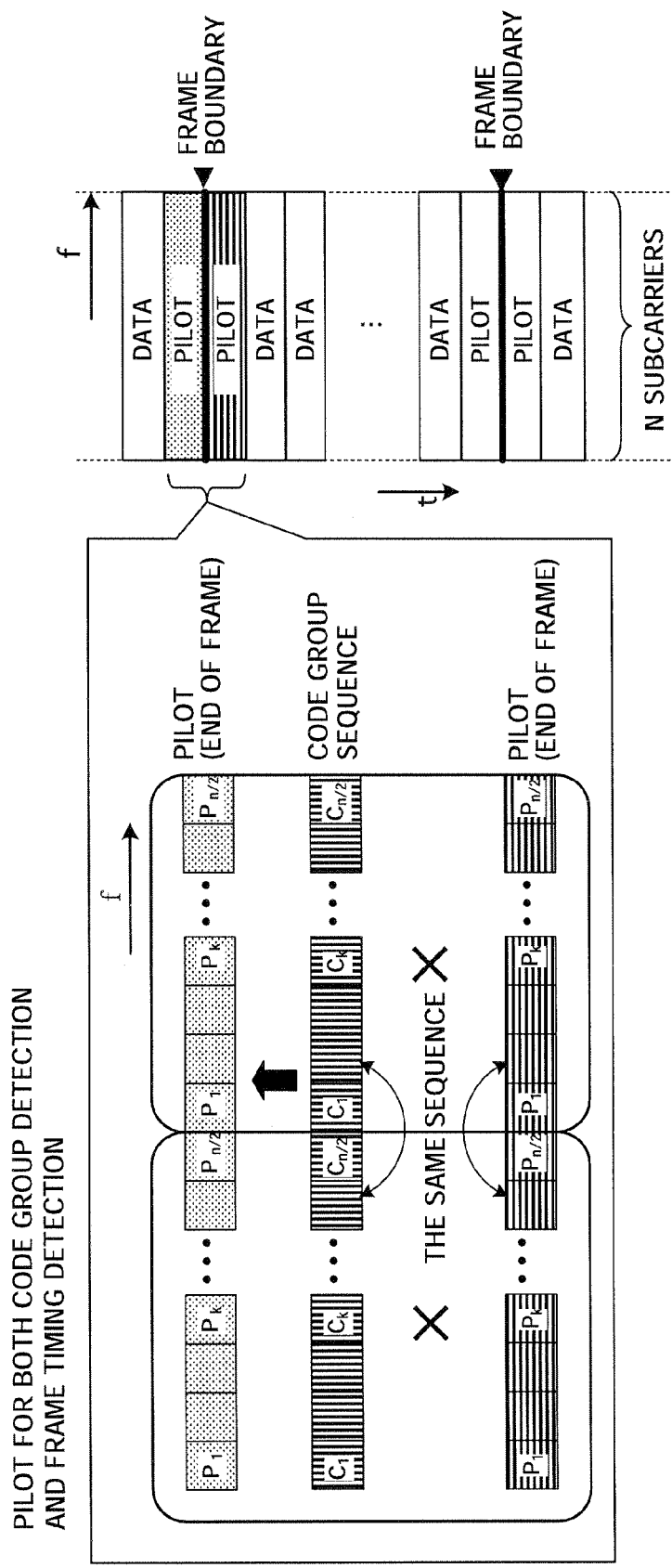
FIG. 28 is a transmission frame format of a base station apparatus according to Embodiment 7.

FIG. 28 is a transmission frame format of base station apparatus 100 according to this embodiment. With this embodiment, pilot symbol for both code group detection and frame timing detection (described later) are provided. As shown in FIG. 28, subcarriers of pilot symbols neighboring each other on the frame boundary are divided into two in the frequency axis direction, the same pilot sequences (P1 to Pn/2) are arranged on both of divided subcarriers. The pilot symbol multiplied by the same code group sequence (C1 to Cn/2) at the end of a frame—that is, (P1'-Pn/2')—is used as a pilot symbol for both code group detection and frame timing detection. That is, the subcarriers at the head of the frame and at the end of the frame are divided into two, the same pilot sequences (P1 to Pn/2) are arranged on both subcarriers, and the same pilot sequences (P1 to Pn/2) on both subcarriers at the end of the frame are multiplied by the same code group sequence (C1 to Cn/2).

Figure 29:
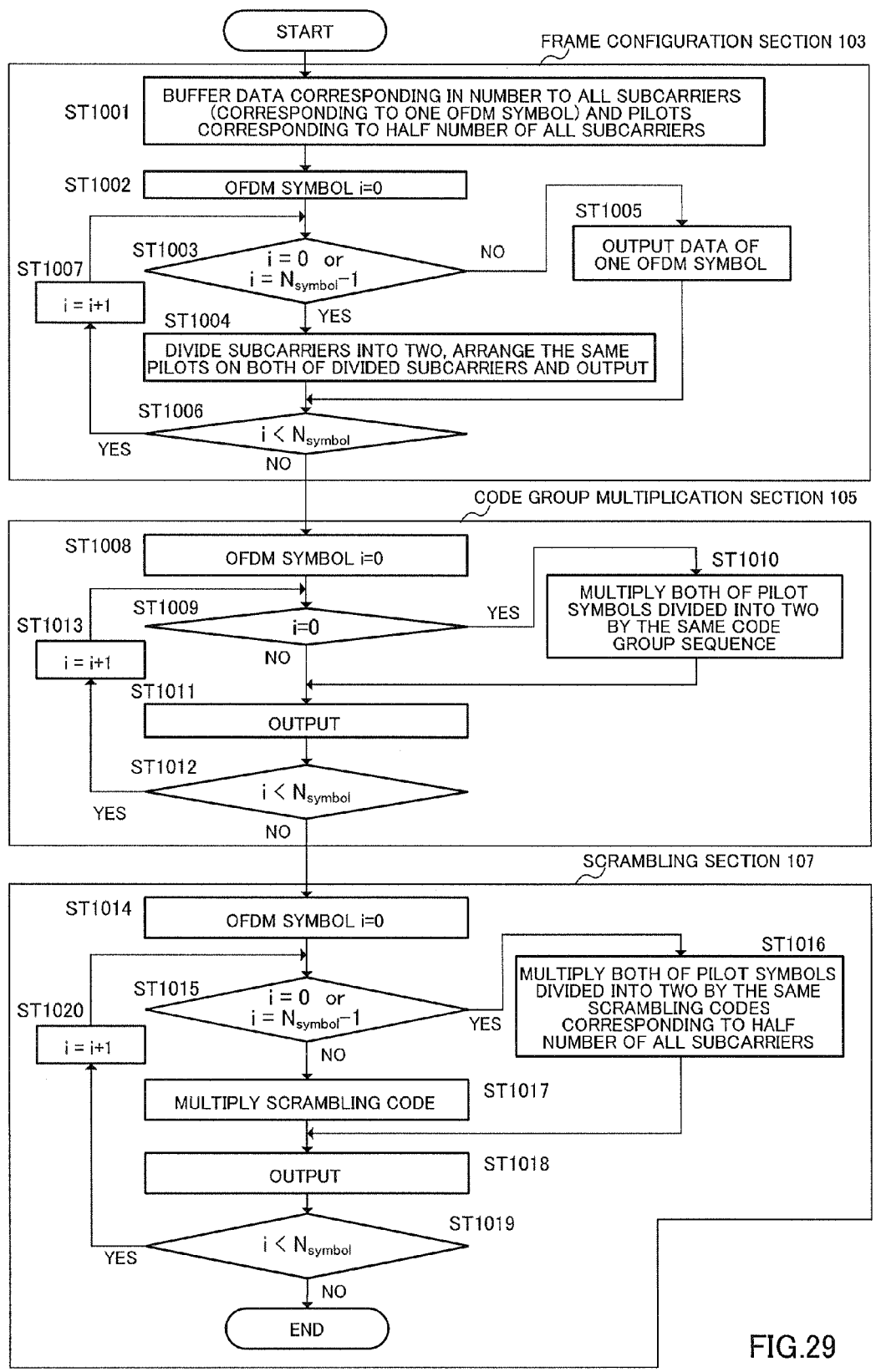
FIG. 29 is an operation flowchart of the base station apparatus according to Embodiment 7.

The configuration of base station apparatus 100 according to this embodiment is the same as in Embodiment 1 (FIG. 5). However, the operations of frame configuration section 103, code group multiplication section 105 and scrambling section 107 are different. Hereinafter, the operations of frame configuration section 103, code group multiplication section 105 and scrambling section 107 according to this embodiment will be explained using a flowchart in FIG. 29. ST1001 to 1007 are processing at frame configuration section 103. ST1008 to 1013 are processing at code group multiplication section 105. ST1014 to 1020 are processing at scrambling section 107.

In base station apparatus 100, using the transmission data and pilot signals modulated by modulation section 102 as inputs, frame configuration section 103 buffers data corresponding in number to all subcarriers (corresponding to one OFDM symbol) and pilot signals corresponding to half the number of all subcarriers (ST1001). Next, OFDM symbol number i is reset (ST1002). Assume that the number of OFDM symbols per frame is $N_{symbol}$, and, when OFDM symbol number i=0 or $N_{symbol}-1$ (ST1003: YES), subcarriers are divided into two in the frequency axis direction, and the same pilot sequences are arranged on both divided subcarriers and are output from frame configuration section 103 (ST1004). On the other hand, when i=0 or $N_{symbol}-1$ is not the case (ST1003: NO), data of one OFDM symbol is output from frame configuration section 103 (ST1005). Processing in ST1003 to ST1005 are repeated under a condition of i<$N_{symbol}$, assuming i=i+1 (ST1006, ST1007).

After resetting OFDM symbol number i again (ST1008), when the output signal of frame configuration section 103 is symbol number i=0 (ST1009: YES), the output signal of frame configuration section 103 is divided into two in subcarrier units, and both of the divided pilot symbols are multiplied by the same code group sequence selected from the code group sequences stored in code group storage section 104 (ST1010) and are output from code group multiplication section 105 (ST1011) If i=0 is not the case (ST1009: NO), the output signal of frame configuration section 103 is output as is from code group multiplication section 105 (ST1011). The processing in ST1009 to ST1011 are repeated under a condition of i<$N_{symbol}$, assuming i=i+1 (ST1012 and ST1013). The configuration of the frame output as a result is as shown in above FIG. 28.

Next, after resetting OFDM symbol number i again (ST1014), when the output signal of code group multiplication section 105 is symbol number i=0 or $N_{symbol}-1$ (ST1015: YES), both of the pilot symbols divided into two in subcarrier units are multiplied by the same scrambling code which corresponds to half the number of all subcarriers (ST1016) and are output from scrambling section 107 (ST1018). On the other hand, when i=0 or $N_{symbol}-1$ is not the case (ST1015: NO), the symbol is multiplied by a scrambling code (ST1017) and is output from scrambling section 107 (ST1018). Processing in ST1015 to ST1018 are repeated under a condition of i<$N_{symbol}$, assuming i=i+1 (ST1019 and ST1020). Radio transmission section 111 transmits a frame including such pilots for both code group detection and frame timing detection to mobile station apparatus 200.

Next, the operations of mobile station apparatus 200 according to this embodiment will be explained. The configuration of mobile station apparatus 200 is the same as in Embodiment 1 (FIG. 7). However, the processing in the second stage of a cell search is different. Hereinafter, the processing in the second stage according to this embodiment will be explained using FIGS. 30 to 32.

Figure 30:
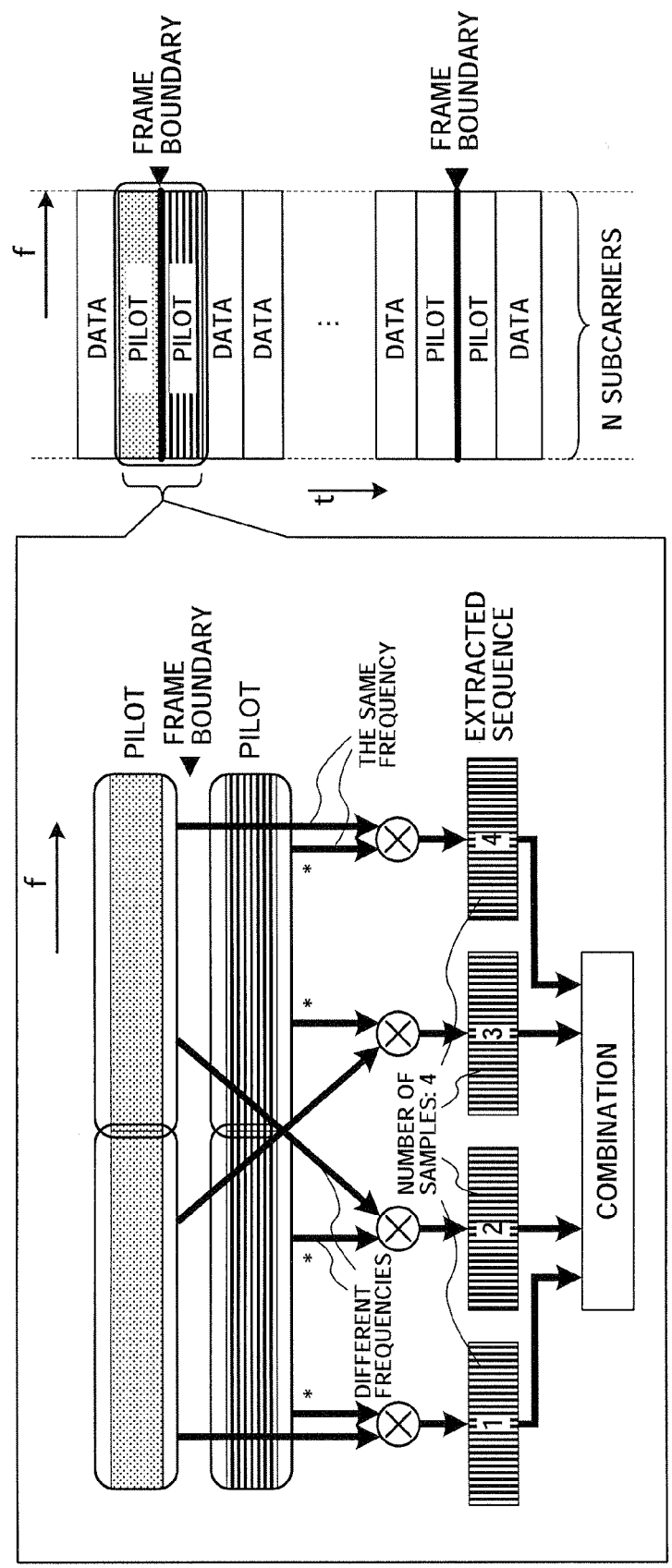
FIG. 30 shows the cell search operations by a mobile station apparatus according to Embodiment 7.

(Detection of Frame Timing: FIG. 30)

First, according to symbol timing detected at FFT timing detection section 603, frame timing detection section 606 divides pilot symbols into two in subcarrier units on the frequency axis and carries out a complex conjugate multiplication among subcarriers of the same frequency band and between symbols neighboring each other on the frame boundary, thereby extracting two sequences. Furthermore, frame timing detection section 606 carries out a complex conjugate multiplication among subcarriers of different frequency bands and between symbols neighboring each other on the frame boundary, thereby extracting two more sequences. In this way, frame timing detection section 606 extracts four sequences (ST1101 and ST1102). Then, the four extracted code group sequences are combined (ST1103). Assuming N=$N_{symbol}$, if symbol i is i<$N_{symbol}$ (ST1104: YES), the processing returns to ST1102, assuming i=i+1 (ST1105). If i<$N_{symbol}$ is not the case (ST1104: NO), assume that the boundary between neighboring symbols i and i+1 that obtain the maximum combined value in ST1103 is frame timing (ST1106).

The "combination" here means carrying out a correlation calculation between two sequences out of the four extracted code group sequences and summing two correlation values obtained, or carrying out an in-phase addition on two sequences out of the four extracted code group sequences and carrying out a correlation calculation between the two sequences obtained in the addition.

Figure 31:
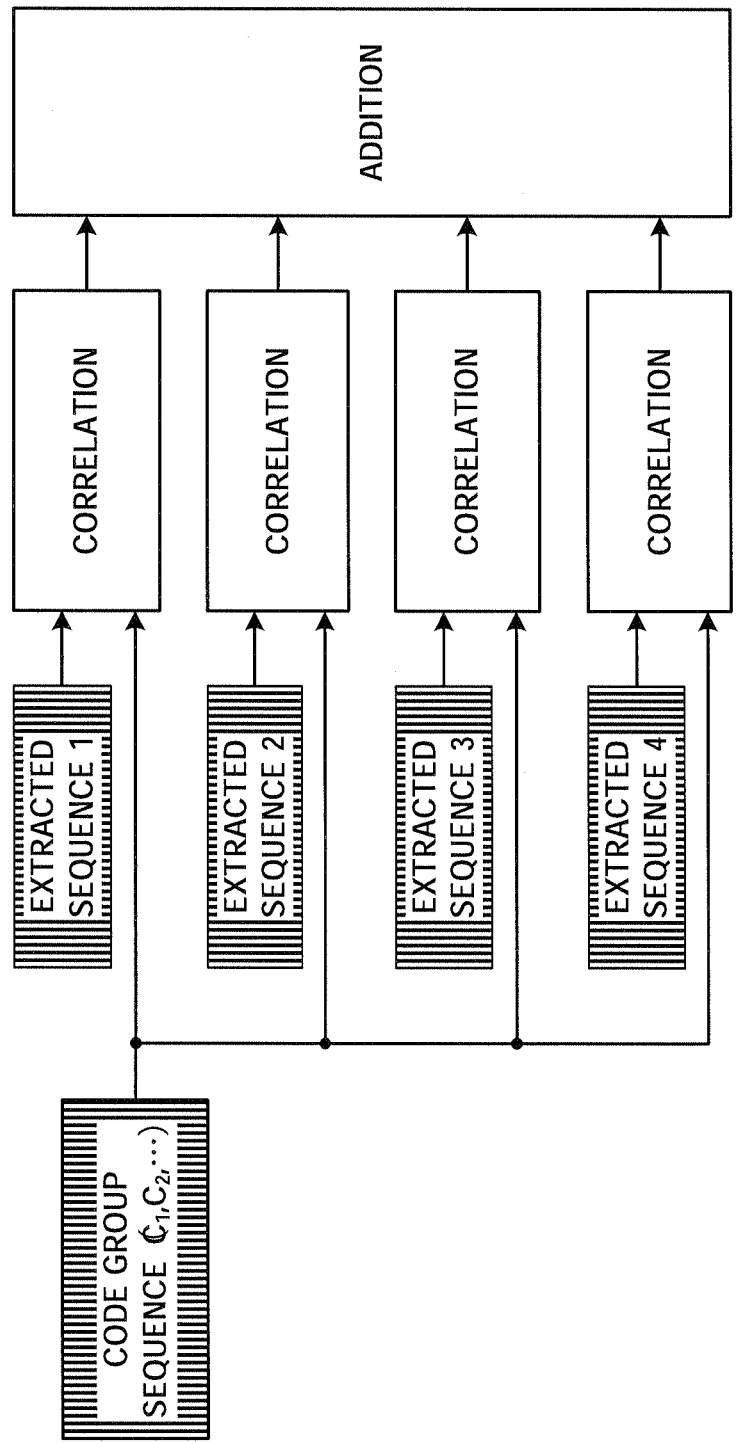
FIG. 31 shows the cell search operations by the mobile station apparatus according to Embodiment 7.
Figure 32:
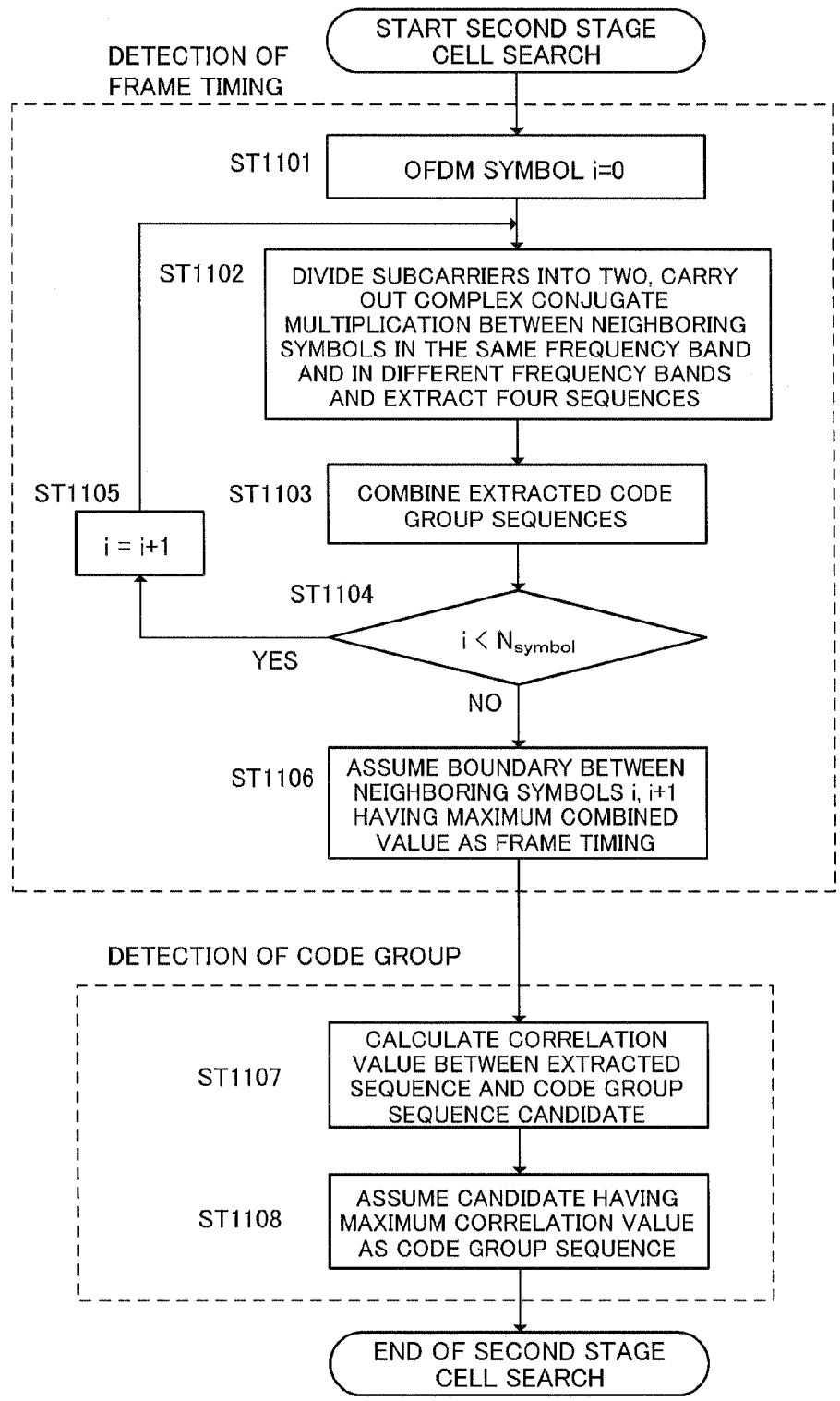
FIG. 32 is an operation flowchart of the mobile station apparatus according to Embodiment 7.

(Detection of Code Group: FIG. 31)

A correlation value between the four code group sequences extracted in ST1102 (extraction sequences 1 to 4) and the code group sequence candidates is calculated, and the results are summed (ST1107). Then, assume that a candidate having the maximum addition correlation value as the addition result is a code group sequence (ST1108). In ST1107, an in-phase addition may be carried out on the extracted four code group sequences, and a correlation between the sequence after the addition and the code group sequence candidate may be calculated.

In this way, according to this embodiment, frame timing detection processing and code group detection processing are performed in one frame, so that it is possible to reduce the amount of calculation processing in the second stage of the cell search and shorten the cell search time, thereby enabling the faster cell search. Furthermore, subcarriers of pilot symbols neighboring each other on the frame boundary are divided into two in the frequency axis direction, the same pilot sequences are arranged on both of the divided subcarriers, so that it is possible to carry out a complex conjugate multiplication between neighboring symbols not only in the same frequency band but also in different frequency bands, thereby increasing the number of code group sequences which can be extracted (that is, the number of samples to be combined) in the detection processing of frame timing. For example, compared to Embodiment 4, the number of code group sequences which can be extracted doubles—that is, the number of samples of correlation calculation doubles. Therefore, a greater correlation value is obtained, so that the frame timing detection accuracy and the code group detection accuracy improve.

With this embodiment, the same two pilot sequences and the same two code group sequences are arranged in the neighboring subcarriers but three or more same pilot sequences and three or more same code group sequences may be arranged.

Furthermore, with this embodiment, a scrambling code by which a pilot is multiplied if of half the length of all subcarriers, and, therefore, the length of the scrambling code used for the identification processing of the scrambling code in the third stage is also reduces by half.

(Embodiment 8)

Figure 33:
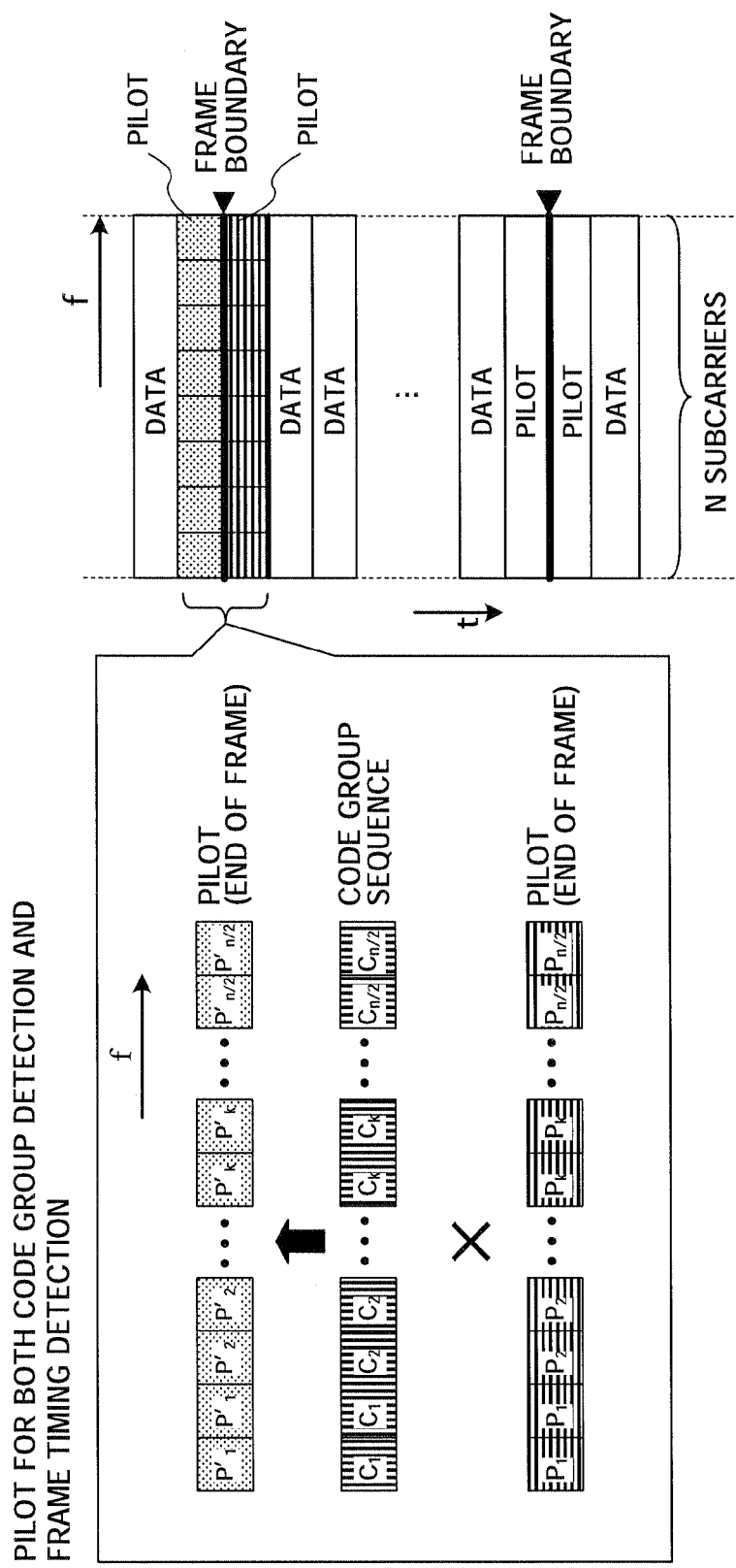
FIG. 33 is a transmission frame format of a base station apparatus according to Embodiment 8.

For Embodiment 7, in the pilot symbol configuration as shown in above FIG. 28, with a propagation path characteristic having a large frequency variation due to frequency selective fading or the like, a high correlation value is not obtained when a correlation between two-divided code group sequences is calculated, and detection accuracy of frame timing may be degraded. Therefore, with this embodiment, as shown in FIG. 33, by adopting a frame configuration where the same two pilot symbols (P1, P1, P2, P2, . . . , Pn/2, Pn/2, where P1, P2, . . . , Pn/2 are pilot symbols different from each other) are alternately arranged every two symbols in the frequency axis direction, so that the influence of the frequency variation is reduced and the accuracy of frame timing detection improves. Furthermore, this embodiment multiplies the same pilot symbols alternately arranged every two symbols on the frequency axis at the end of a frame, by the same code group sequence, respectively.

Figure 34:
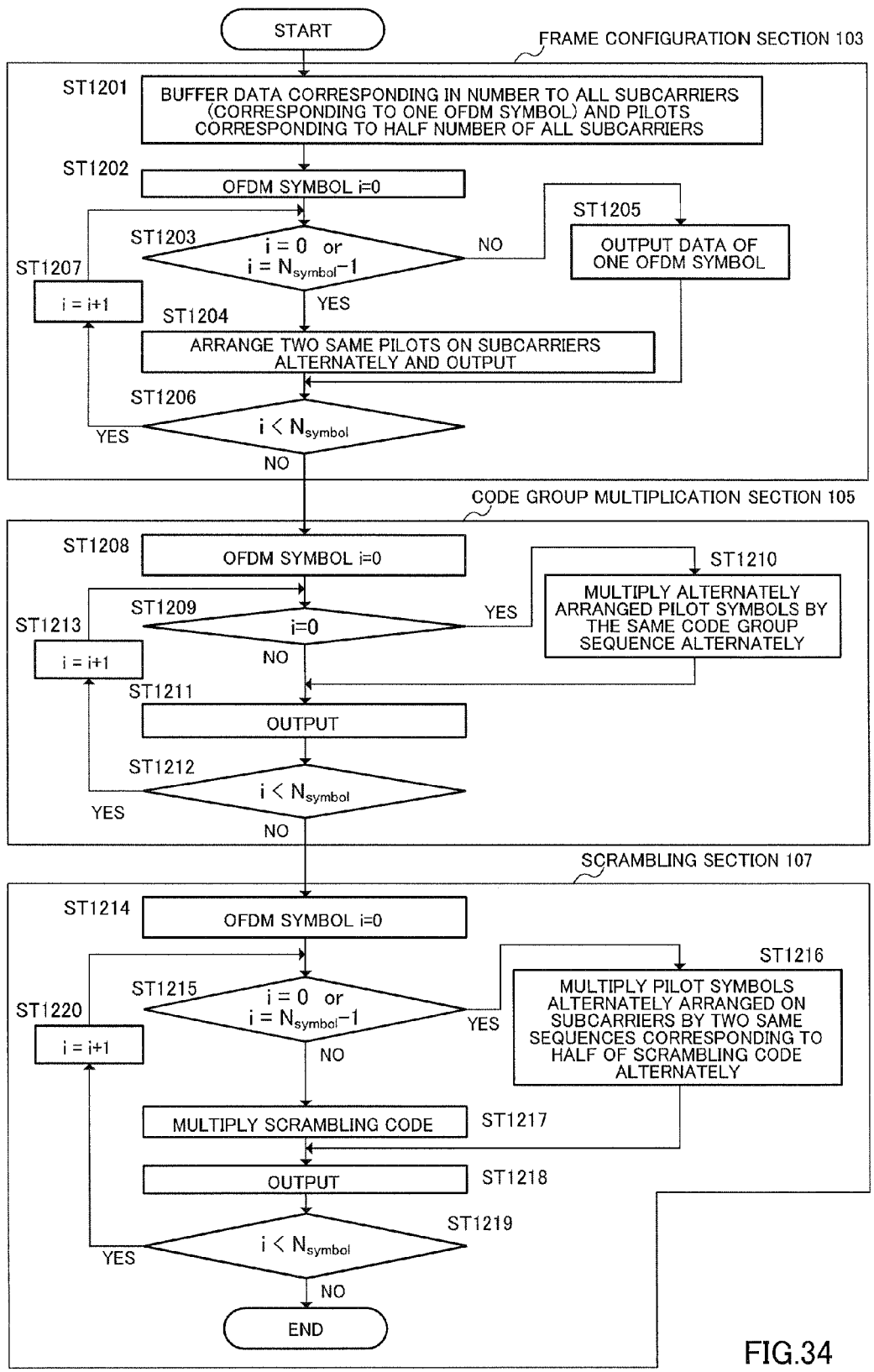
FIG. 34 is an operation flowchart of the base station apparatus according to Embodiment 8.

The configuration of base station apparatus 100 according to this embodiment is the same as in Embodiment 1 (FIG. 5). However, the operations of frame configuration section 103, code group multiplication section 105 and scrambling section 107 are different. Hereinafter, the operations of frame configuration section 103, code group multiplication section 105 and scrambling section 107 according to this embodiment will be explained using a flowchart in FIG. 34. ST1201 to 1207 are processing at frame configuration section 103, ST1208 to 1213 are processing at code group multiplication section 105 and ST1214 to 1220 are processing at scrambling section 107.

In base station apparatus 100, using the transmission data and pilot signals modulated by modulation section 102 as input, frame configuration section 103 buffers data corresponding in number to all subcarriers (corresponding to one OFDM symbol) and pilot signals corresponding to half the number of all subcarriers (ST1201). Next, OFDM symbol number i is reset (ST1202). Assume that the number of OFDM symbols per frame is $N_{symbol}$, when OFDM symbol number i=0 or $N_{symbol}$−1 (ST1203: YES), the same pilot signals are arranged alternately on subcarriers every two symbols and are output from frame configuration section 103 (ST1204). On the other hand, when i=0 or $N_{symbol}$−1 is not the case (ST1203: NO), data of one OFDM symbol is output from frame configuration section 103 (ST1205). Processing in ST1203 to ST1205 are repeated under a condition of i<$N_{symbol}$, assuming i=i+1 (ST1206 and ST1207).

After resetting OFDM symbol number i again (ST1208), when the output signal of frame configuration section 103 is symbol number i=0 (ST1209: YES), the pilot symbols alternately arranged on each subcarrier every two symbols are alternately multiplied by the same code group sequence selected from code group sequences stored in code group storage section 104 (ST1210) and are output from code group multiplication section 105 (ST1211). When i=0 is not the case (ST1209: NO), the output signal of frame configuration section 103 is output as is from code group multiplication section 105 (ST1211). The processing in ST1209 to ST1211 are repeated under a condition of i<$N_{symbol}$, assuming i=i+1 (ST1212, ST1213) The configuration of the frame output as a result is as shown in above FIG. 33.

After resetting OFDM symbol number i again (ST1214), when the output signal of code group multiplication section 105 is symbol number i=0 or $N_{symbol}$−1 (ST1215: YES), the pilot symbols alternately arranged on subcarriers every two symbols are alternately multiplied by two same sequences having a length half of a scrambling code selected in scrambling code storage section 106 (may be the first half or second half of the scrambling code) (ST1216) and are output from scrambling section 107 (ST1218). On the other hand, when i=0 or $N_{symbol}$−1 is not the case (ST1215: NO), the symbols are multiplied by a scrambling code (ST1217) and are output from scrambling section 107 (ST1218). The processing in ST1215 to ST1218 are repeated under a condition of i<$N_{symbol}$, assuming i=i+1 (ST1219 and ST1220). Radio transmission section 111 transmits a frame including such pilots for both code group detection and frame timing detection to mobile station apparatus 200.

Next, the operations of mobile station apparatus 200 according to this embodiment will be explained. The configuration of mobile station apparatus 200 is the same as in Embodiment 1 (FIG. 7). However, the processing in the second stage of a cell search is different. Hereinafter, the processing in the second stage according to this embodiment will be explained using FIGS. 35 and 36. Detection of a code group is the same as in Embodiment 7, explanations thereof will be omitted.

Figure 35:
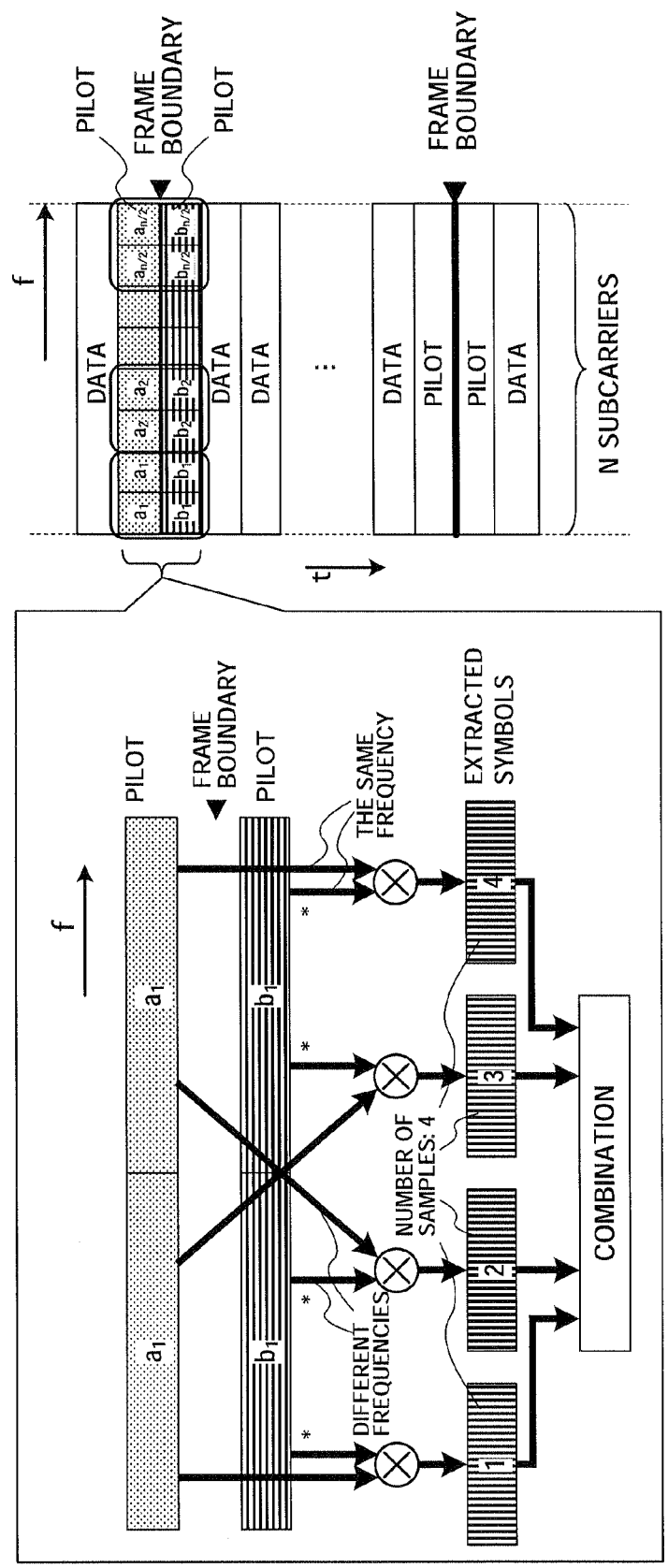
FIG. 35 shows the cell search operations by a mobile station apparatus according to Embodiment 8.
Figure 36:
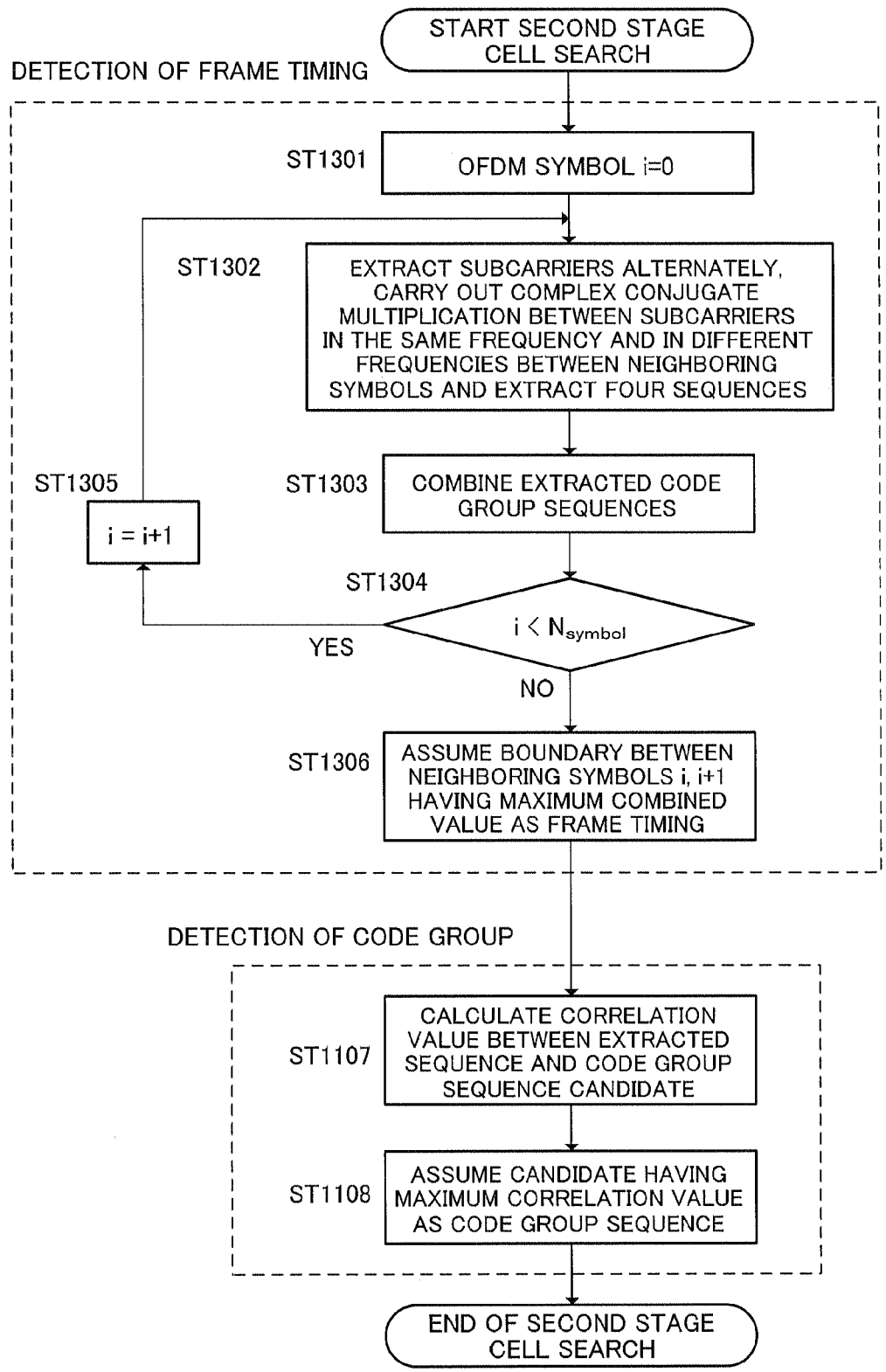
FIG. 36 is an operation flowchart of the mobile station apparatus according to Embodiment 8.

(Detection of Frame Timing: FIG. 35)

First, according to symbol timing detected at FFT timing detection section 603, frame timing detection section 606 alternately extracts two subcarriers at a time and carries out a complex conjugate multiplication among subcarriers in the same frequency and between neighboring symbols, thereby extracting two sequences. Furthermore, frame timing detection section 606 carries out a complex conjugate multiplication among subcarriers in different frequencies and between symbols neighboring each other, thereby extracting two more sequences. In this way, frame timing detection section 606 extracts four sequences (ST1301 and ST1302). The four extracted code group sequences are then combined (ST1303). Assuming N=$N_{symbol}$, if symbol i is i<$N_{symbol}$ (ST1304: YES), the processing returns to ST1302 assuming i=i+1 (ST1305). If i<$N_{symbol}$ is not the case (ST1304: NO), assume that the boundary between neighboring symbols i and i+1 that obtain the maximum combined value in ST1303 is frame timing (ST1306).

The "combination" here means, as in the case of Embodiment 7, carrying out a correlation calculation between two sequences out of the four extracted code group sequences and summing two correlation values obtained, or carrying out an in-phase addition on two sequences out of the four extracted code group sequences and carrying out a correlation calculation between the two sequences obtained in the addition.

In this way, according to this embodiment, frame timing detection processing and code group detection processing are performed in one frame, so that it is possible to reduce the amount of calculation processing in the second stage of the cell search and shorten the cell search time, thereby enabling the faster cell search. Furthermore, by alternately arranging the same pilot symbols every two symbols in the frequency axis direction, so that it is possible to carry out a complex conjugate multiplication between neighboring symbols not only in the same frequency but also in difference frequencies and thereby increase the number of code group sequences which can be extracted (that is, the number of samples to be combined). For example, compared to Embodiment 5, the number of the code group sequences which can be extracted doubles. That is, the number of samples of correlation calculation doubles. Therefore, a greater correlation value is obtained, so that the frame timing detection accuracy and the code group detection accuracy improve.

Although, with this embodiment, like in the case of Embodiment 7, two same pilot sequences and two same code group sequences are arranged on the neighboring subcarriers, three or more same pilot sequences and three or more same code group sequences may also be arranged.

Furthermore, with this embodiment, like in the case of Embodiment 7, a scrambling code by which a pilot is multiplied is of half the length of all subcarriers, and, therefore, the length of the scrambling code used for identification processing of the scrambling code in the third stage is also reduced by half.

Each of the above described embodiments has been explained taking a case where the present invention is configured by hardware as an example, but the present invention can also be implemented by software.

In addition, each of functional blocks employed in the description of the above-mentioned embodiment may typically be implemented as an LSI constituted by an integrated circuit. These are may be individual chips or partially or totally contained on a single chip.

"LSI" is adopted here but this may also be referred to as an "IC," "system LSI," "super LSI," or "ultra LSI" depending on differing extents of integration.

Further, the method of integrating circuits is not limited to the LSI's, and implementation using dedicated circuitry or general purpose processor is also possible. After LSI manufacture, utilization of FPGA (Field Programmable Gate Array) or a reconfigurable processor where connections or settings of circuit cells within an LSI can be reconfigured is also possible.

Furthermore, if integrated circuit technology comes out to replace LSI's as a result of the advancement of semiconductor technology or derivative other technology, it is naturally also possible to carry out function block integration using this technology. Application in biotechnology is also possible.

The present application is based on Japanese Patent Application No. 2004-289149 filed on Sep. 30, 2004 and Japanese Patent Application No. 2005-130440 filed on Apr. 27, 2005, the entire content of which is expressly incorporated by reference herein.

INDUSTRIAL APPLICABILITY

The present invention is suitable for use in a radio mobile station apparatus and a radio communication base station apparatus or the like used in a mobile communication system.

The invention claimed is:

1. A base station apparatus comprising:
a multiplication section that multiplies a specific pilot symbol or a specific data symbol among symbols included in each of frames by a code group sequence indicating a code group of a scrambling code applied to the symbols included in each of the frames, to generate a code group detection symbol, the specific pilot symbol or the specific data symbol being one of the symbols included in each of the frames;
a scrambling section that multiplies the symbols included in each of the frames by the scrambling code; and
a transmission section that transmits the symbols which are multiplied by the scrambling code in each of the frames, wherein:
pilot symbols are arranged at both a head and a tail end of the symbols included in each of the frames,
the multiplication section multiplies by the code group sequence so that a frame timing detection symbol and the code group detection symbol are arranged in the frames,
the frame timing detection symbol includes the pilot symbols which are comprised of the same sequence and which are arranged at the tail end of the symbols included in a first frame and the head of the symbols included in a second frame next to the first frame, and
the code group detection symbol includes the specific pilot symbol or the specific data symbol which is multiplied by the code group sequence.

2. The base station apparatus according to claim 1, wherein the pilot symbols which are comprised of the same sequence and which are included in the frame timing detection symbol, are not multiplied by the code group sequence.

3. The base station apparatus according to claim 1, wherein the pilot symbols are comprised of the same sequence, and the multiplication section multiplies the specific pilot symbol arranged at the tail end of the symbols included in each of the frame by the code group sequence every two frames, to generate the code group detection symbol.

4. The base station apparatus according to claim 1, wherein the pilot symbols are comprised of the same sequence, and the multiplication section multiplies the specific data which is one of two identical neighboring data symbols on a time axis by the code group sequence.

5. The base station apparatus according to claim 1, wherein, the pilot symbols are comprised of the same sequence;
the specific pilot symbol comprised of the same sequence is arranged next to the pilot symbol at the head of the symbols included in each of the frames, and
the multiplication section multiplies the specific pilot symbol to generate the code group detection symbol.

6. The base station apparatus according to claim 1, wherein the multiplication section divides the pilot symbol arranged at the tail end of the symbols included in the frames, into two blocks on a frequency axis and multiplies both of the blocks by the same code group sequence.

7. The base station apparatus according to claim 1, wherein different pilot symbols are arranged alternately on a frequency axis at each of the head of the symbols and the tail end of the symbols in the frames, and
the multiplication section multiplies the pilot symbols alternately arranged on the frequency axis at the tail end of the symbols by the code group sequence, to generate the code group detection symbol.

8. The base station apparatus according to claim 1, wherein the multiplication section divides the pilot symbol arranged at the tail end of the symbols included in each of the frames into N number of blocks on a frequency axis and multiplies a block corresponding to a code group number of the applied scrambling code among the N number of the blocks by the code group sequence, where N is the number of code groups.

9. The base station apparatus according to claim 1, wherein the frame timing detection symbol and the code group detection symbol are arranged alternately.

10. A mobile station apparatus comprising:
a first detection section that detects a frame timing using a frame timing detection symbol included in each of frames that include symbols which are multiplied by a scrambling code;
a second detection section that obtains a code group detection symbol which is multiplied by a code group sequence indicating a code group of the scrambling code, from the frame based on the detected frame timing, and detects the code group of the scrambling code using the obtained code group detection symbol; and
a descrambling section that descrambles the symbols included in the frame using a scrambling code belonging to the detected code group,
wherein pilot symbols are arranged at both a head and a tail end of the symbols included in each of the frames;
the frame timing detection symbol includes pilot symbols which are comprised of the same sequence and which are arranged at the tail end of the symbols included in a first frame and the head of the symbols included in a second frame next to the first frame;
the code group detection symbol includes a specific pilot symbol or a specific data which is multiplied by the code group sequence, and
the frame timing detection symbol and the code group detection symbol are arranged in the frames.

11. The mobile station apparatus according to claim 10, wherein, in each of the frames, the first detection section calculates a correlation value between the pilot symbol arranged at the tail end of the symbols included in a first frame and the pilot symbol arranged at the head of the symbols included in a second frame following the first frame, and detects the frame timing in accordance with the correlation value.

12. The mobile station apparatus according to claim 10, wherein the first detection section divides the pilot symbols arranged at the tail end of the symbols included in a first frame and the head of the symbols included in a second frame following the first frame, into two blocks respectively on a frequency axis, carries out a complex conjugate multiplication between the pilot symbols on both of the divided blocks, carries out a correlation calculation on a plurality of sequences extracted by the complex conjugate multiplication, and detects the frame timing in accordance with a correlation value obtained by the correlation calculation.

13. The mobile station apparatus according to claim 12, wherein the second detection section calculates a plurality of correlation values between the code group sequence and the plurality of sequences extracted by the complex conjugate multiplication, and detects the code group in accordance with a total of the plurality of correlation values.

14. The mobile station apparatus according to claim 10, wherein the first detection section divides the pilot symbols arranged at the tail end of the symbols included in a first frame and the head of the symbols included in a second frame following the first frame, into two blocks respectively on a frequency axis, carries out a complex conjugate multiplication between the pilot symbols on one of the blocks in a same frequency, carries out a complex conjugate multiplication between the pilot symbols on one of the blocks in different frequencies, carries out a correlation calculation on a plurality of sequences extracted by the complex conjugate multiplications and detects the frame timing in accordance with a correlation value obtained by the correlation calculation.

15. The mobile station apparatus according to claim 10, wherein the second detection section specifies a position of the code group detection symbol in accordance with the frame timing.

16. A cell search method comprising:
receiving a frame timing detection symbol and a code group detection symbol in each of frames that include symbols which are multiplied by a scrambling code;
detecting a frame timing using the frame timing detection symbol;
obtaining the code group detection symbol which is multiplied by a code group sequence indicating a code group of the scrambling code, from the frame based on the detected frame timing and detecting the code group of the scrambling code using the obtained code group detection symbol; and
descrambling symbols included in the frame using the scrambling code belonging to the detected code group,
wherein pilot symbols are arranged at both a head and a tail end of the symbols included in each of the frames;
the frame timing detection symbol includes pilot symbols which are comprised of the same sequence and which are arranged at the tail end of the symbols included in a first frame and the head of the symbols included in a second frame next to the first frame;
the code group detection symbol includes a specific pilot symbol or a specific data which is multiplied by the code group sequence, and
the frame timing detection symbol and the code group detection symbol are arranged in the frames.

17. A transmission method comprising:
multiplying a specific pilot symbol or a specific data symbol among symbols included in each of frames by a code group sequence indicating a code group of a scrambling code applied to the symbols included in each of the frames to generate a code group detection symbol, the specific pilot symbol or the specific data symbol being one of the symbols included in each of the frames;
multiplying the symbols included in each of the frames by the scrambling code; and
transmitting the symbols which are multiplied by the scrambling code in each of the frames, wherein:
pilot symbols are arranged at both a head and a tail end of the symbols included in each of the frames; and
the code group sequence is multiplied so that a frame timing detection symbol and the code group detection symbol are arranged in the frames,
the frame timing detection symbol including the pilot symbols which are comprised of the same sequence and which are arranged at the tail end of the symbols included in a first frame and the head of the symbols included in a second frame next to the first frame, and,
the code group detection symbol including the specific pilot symbol or the specific data which is multiplied by the code group sequence.

* * * * *